US012424772B2

(12) United States Patent
Sung

(10) Patent No.: US 12,424,772 B2
(45) Date of Patent: Sep. 23, 2025

(54) BUS BAR CONNECTOR HAVING A REPLACEABLE FUSE

(71) Applicant: BELLWETHER ELECTRONIC CORP., Taoyuan (TW)

(72) Inventor: Tai-Ching Sung, Taoyuan (TW)

(73) Assignee: BELLWETHER ELECTRONIC CORP., Taoyuan (TW)

( * ) Notice: Subject to any disclaimer, the term of this patent is extended or adjusted under 35 U.S.C. 154(b) by 551 days.

(21) Appl. No.: 17/970,793

(22) Filed: Oct. 21, 2022

(65) Prior Publication Data

US 2023/0402773 A1 Dec. 14, 2023

(30) Foreign Application Priority Data

Jun. 9, 2022 (TW) .................................. 111121368

(51) Int. Cl.
*H01R 9/24* (2006.01)
*H01R 4/30* (2006.01)
*H01R 9/22* (2006.01)

(52) U.S. Cl.
CPC ............. *H01R 9/245* (2013.01); *H01R 9/223* (2013.01); *H01R 9/2491* (2013.01); *H01R 4/308* (2013.01)

(58) Field of Classification Search
CPC ...... H01R 9/245; H01R 9/223; H01R 9/2491; H01R 4/308; H01R 31/065; H01R 13/66; H01R 13/6608; H01R 13/684; H01R 13/688; H01R 13/692; H01R 13/502; H01R 13/516; H01R 13/518; H01R 12/53; H01R 12/70; H01R 12/77; H01R 12/81; H02S 40/34
See application file for complete search history.

(56) References Cited

U.S. PATENT DOCUMENTS 5,667,389 A * 9/1997 Kidd .................. B60R 16/0238 439/651
6,520,780 B2 * 2/2003 Chemin ................. H05K 7/026 439/76.2

(Continued)

FOREIGN PATENT DOCUMENTS

TW M253114 U 12/2004
TW M276362 U 9/2005

*Primary Examiner* — Renee S Luebke
*Assistant Examiner* — Paul D Baillargeon
(74) *Attorney, Agent, or Firm* — Li & Cai Intellectual Property (USA) Office

(57) ABSTRACT

A bus bar connector with a replaceable fuse are provided. A first terminal assembly inside the casing includes a first connecting element and plural first resilient contacts electrically connected with the first connecting element. A second terminal assembly inside the casing includes a second connecting element and plural second resilient contacts. An end of the second connecting element is electrically connected with the plural second resilient contacts, and another end of the second connecting element extends to form a cable connecting portion. The first cable assembly includes a first cable body extending from at least one of the left and right sides of the casing, and a cable connection portion connected to one side of the first cable body. The fuse element is connected in series between the cable connection portion and the first connecting element. The second cable assembly is electrically connected to the cable connecting portion.

20 Claims, 23 Drawing Sheets

(56) References Cited

U.S. PATENT DOCUMENTS

| | | | | |
|---|---|---|---|---|
| 8,419,475 | B2 * | 4/2013 | von Zur Muehlen | H01H 85/202<br>439/893 |
| 2013/0280928 | A1 * | 10/2013 | Schweitzer | H01R 9/226<br>439/76.2 |
| 2018/0069349 | A1 * | 3/2018 | Kato | H01H 85/47 |

* cited by examiner

BUS BAR CONNECTOR HAVING A REPLACEABLE FUSE

CROSS-REFERENCE TO RELATED PATENT APPLICATION

This application claims the benefit of priority to Taiwan Patent Application No. 111121368, filed on Jun. 9, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "related art" to the disclosure described herein. All references cited and discussed in this specification are incorporated herein by reference in their entireties and to the same extent as if each reference was individually incorporated by reference.

FIELD OF THE DISCLOSURE

The present disclosure relates to a bus bar connector, and more particularly to a bus bar connector having a replaceable fuse.

BACKGROUND OF THE DISCLOSURE

In the related art, bus bar connectors are mainly used in devices such as server chassis. The bus bar connector is suitable for large current, but traditional fuses suitable for high current are large in size. In order to replace the fuse easily, a larger fuse holder is required. However, the server chassis has a limited interior space, and the server chassis requires a working environment with an unobstructed cooling air duct, so that it is impossible to install a fuse holder suitable for high current inside the server chassis.

On the other hand, in order to realize the circuit protection function of the fuse element, several fuse elements are usually soldered on the motherboard of a traditional server device. When the fuse element is burned out and needs to be replaced by a new one, it is necessary to disassemble an external mechanism of the server device to take out the motherboard, and then debond the broken fuse element before it is replaced by a new one. The entire replacement process is complicated and time-consuming.

Therefore, how to arrange a replaceable fuse element inside the plug connector of the bus bar connector through the improvement of structural design has become one of the important issues to be solved in this field.

SUMMARY OF THE DISCLOSURE

In response to the above-referenced technical inadequacy, the present disclosure provides a bus bar connector having a replaceable fuse.

In one aspect, the present disclosure provides a bus bar connector having a replaceable fuse, which includes a casing, a first terminal assembly, a second terminal assembly, at least one first cable assembly, at least one fuse element and at least one second cable assembly. The casing has two socket openings formed on a front side thereof. The first terminal assembly is disposed inside the casing, in which the first terminal assembly includes a first connecting element and plural first resilient contacts, the plural first resilient contacts are disposed to form a first interface, the first interface is communicated with one of the two socket openings, and a first end portion of the first connecting element is electrically connected with the plural first resilient contacts. The second terminal assembly is disposed inside the casing, in which the second terminal assembly includes a second connecting element and plural second resilient contacts, the plural second resilient contacts are disposed to form a second interface, the second interface is communicated with another one of the two socket openings, one end of the second connecting element is electrically connected with the plural second resilient contacts, and another end of the second connecting element extends to form a cable connecting portion. The at least one first cable assembly includes a first cable body and a cable connection portion, in which the cable connection portion is connected to a side of the first cable body, and the first cable body extends from at least one of a left side and a right side of the casing. The at least one fuse element is connected between the cable connection portion and the first connecting element in series, and the at least one second cable assembly is electrically connected to the cable connecting portion.

In another aspect, the present disclosure provides a bus bar connector having a replaceable fuse, which includes a casing, fixed frame, a first terminal assembly, a second terminal assembly, a first cable assembly, at least one fuse element and a second cable assembly. The casing includes two socket openings. The fixed frame is disposed on a side of the casing, in which the fixed frame has an accommodating portion and a first lateral outlet formed on a side. The first terminal assembly is disposed inside the casing, in which the first terminal assembly includes a first connecting element and plural first resilient contacts, the plural first resilient contacts are disposed to form a first interface, the first interface is communicated with one of the two socket openings, an end of the first connecting element is connected with the plural first resilient contacts, and another end of the first connecting element extends inserted into the fixed frame. The second terminal assembly is disposed inside the casing, in which the second terminal assembly includes a second connecting element and plural second resilient contacts, the second connecting element is connected with the plural second resilient contacts, the plural second resilient contacts are disposed to form a second interface, and the second interface is communicated with another one of the two socket openings. The first cable assembly includes a first cable body and a cable connection portion connected to one side of the first cable body, the first cable body has a first fixed portion, and the first fixed portion is disposed at the first lateral outlet. The least one fuse element is disposed in the accommodating portion, in which the least one fuse element is connected between the cable connection portion and the first connecting element. The second cable assembly includes a second cable body, in which the second cable body has a second fixed portion, and the second fixed portion is connected to the second connecting element.

In yet another aspect, the present disclosure provides a bus bar connector having a replaceable fuse, which includes a casing, fixed frame, a first terminal assembly, a second terminal assembly, a first cable assembly, at least one fuse element and a second cable assembly. The casing includes two socket openings. The fixed frame is disposed on an opposite side opposite to a side where the two socket openings of the casing are formed, in which the fixed frame includes a first accommodating portion, a second accommodating portion, and a third accommodating portion, and the first accommodating portion and the second accommodating portion are located on a same side of the third accommodating portion. The first terminal assembly is disposed inside the casing, in which the first terminal assembly includes a first connecting element and plural first resilient contacts, the plural first resilient contacts are disposed to form a first interface, the first interface is communicated with one of the two socket openings, the first connecting element is disposed in the first accommodating portion, and an end of the first connecting element is connected with the plural first resilient contacts, and another end of the first connecting element extends into the third accommodating portion. The second terminal assembly is disposed inside the casing, in which the second terminal assembly includes a second connecting element and plural second resilient contacts, the second connecting element is connected with the plural second resilient contacts, the plural second resilient contacts are disposed to form a second interface, and the second interface is communicated with another one of the two socket openings. The first cable assembly includes a first cable body and a cable connection portion connected to the first cable body, in which the first cable body has a first fixed portion, the first fixed portion is fixed in the first accommodating portion, an end of the cable connection portion is connected to the first fixed portion and another end of the cable connection portion is bent and extended to the third accommodating portion. The least one fuse element is disposed in the third accommodating portion, in which the least one fuse element is connected between the cable connection portion and the first connecting element. The second cable assembly includes a second cable body, in which the second cable body has a second fixed portion, the second fixed portion is fixed in the second accommodating portion, and the second fixed portion is connected to the second connecting element.

The beneficial effect of the present disclosure is that the bus bar connector with the replaceable fuse provided by the present disclosure can utilize the bus bar connector having a fixed frame, and the fixed frame having at least one accommodating portion, so that a first connecting element of the first terminal assembly, a second connecting element of the second terminal assembly and two fuse elements can be disposed in at least one accommodating portion. Compared with the fuse elements in the related art, which are all welded on the motherboard of the server device, the bus bar connector with the replaceable fuse provided by the present disclosure can be configured to place the fuse elements in at least one accommodating portion of the connector, which is convenient for users to replace, simplifies the replacement steps, and improves the work efficiency of replacing the fuse components.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
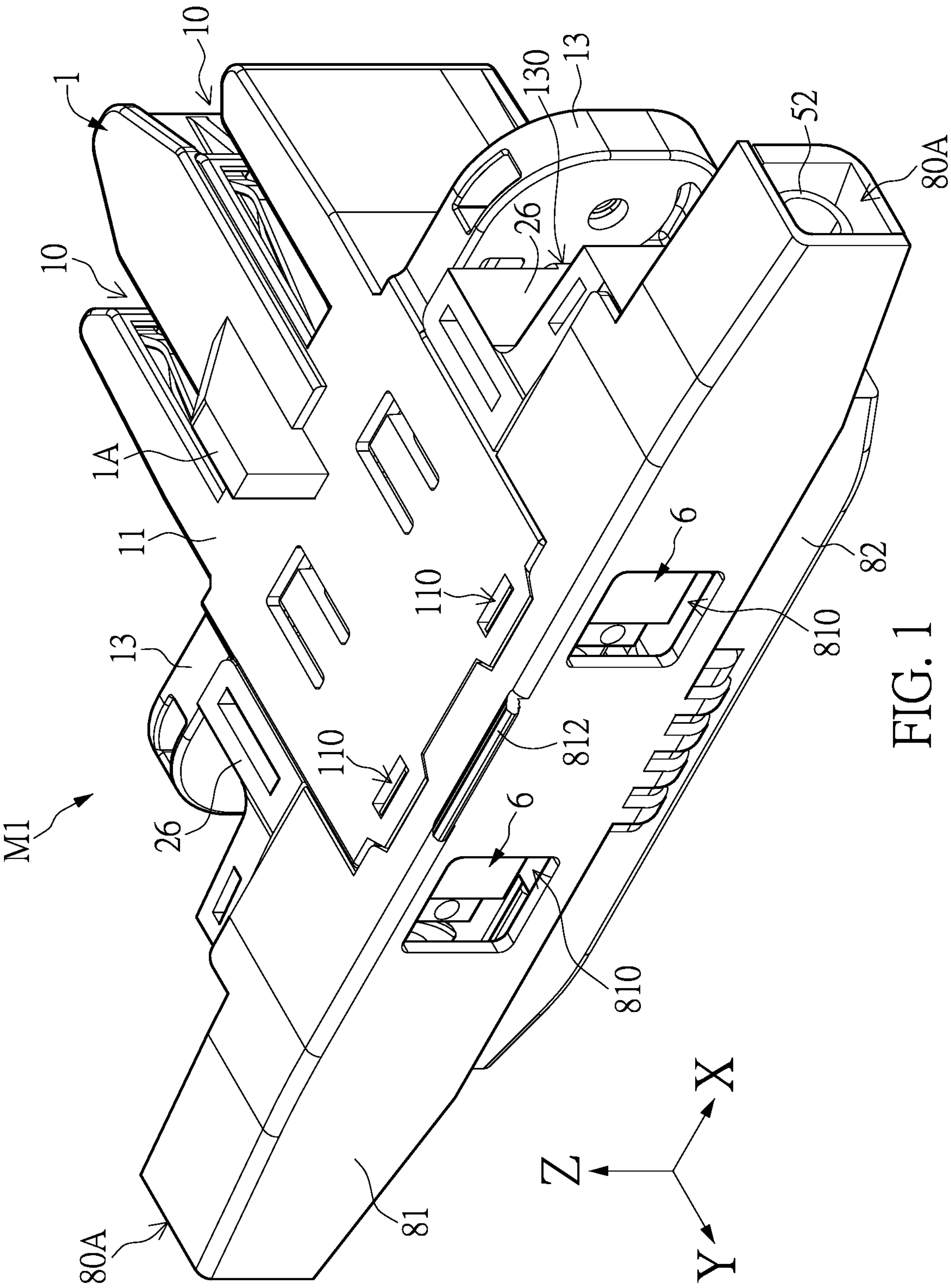
FIG. 1 is a schematic perspective view of a bus bar connector having a replaceable fuse according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
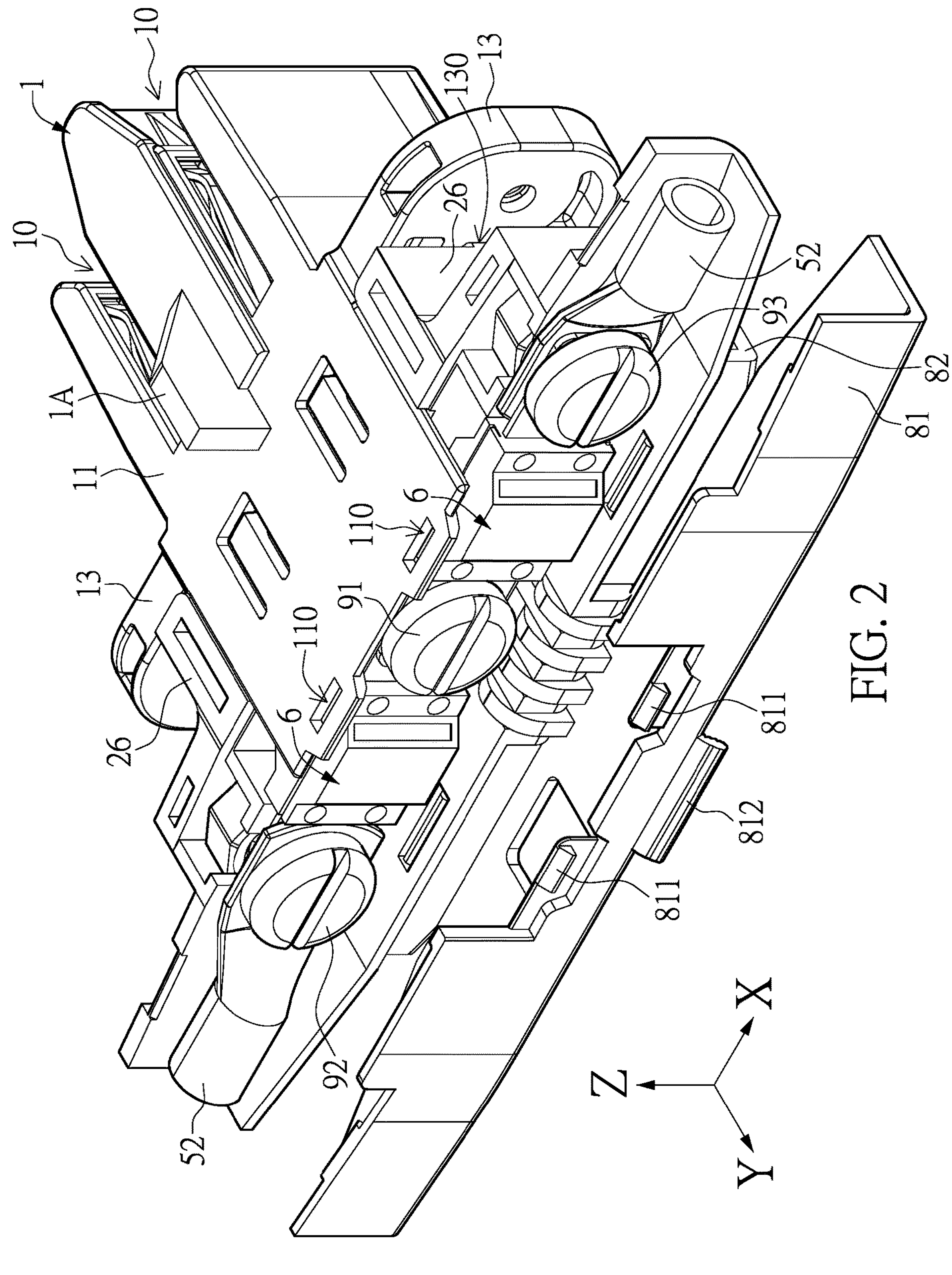
FIG. 2 is another schematic perspective view of the bus bar connector having the replaceable fuse according to the first embodiment of the present disclosure.
Figure 3:
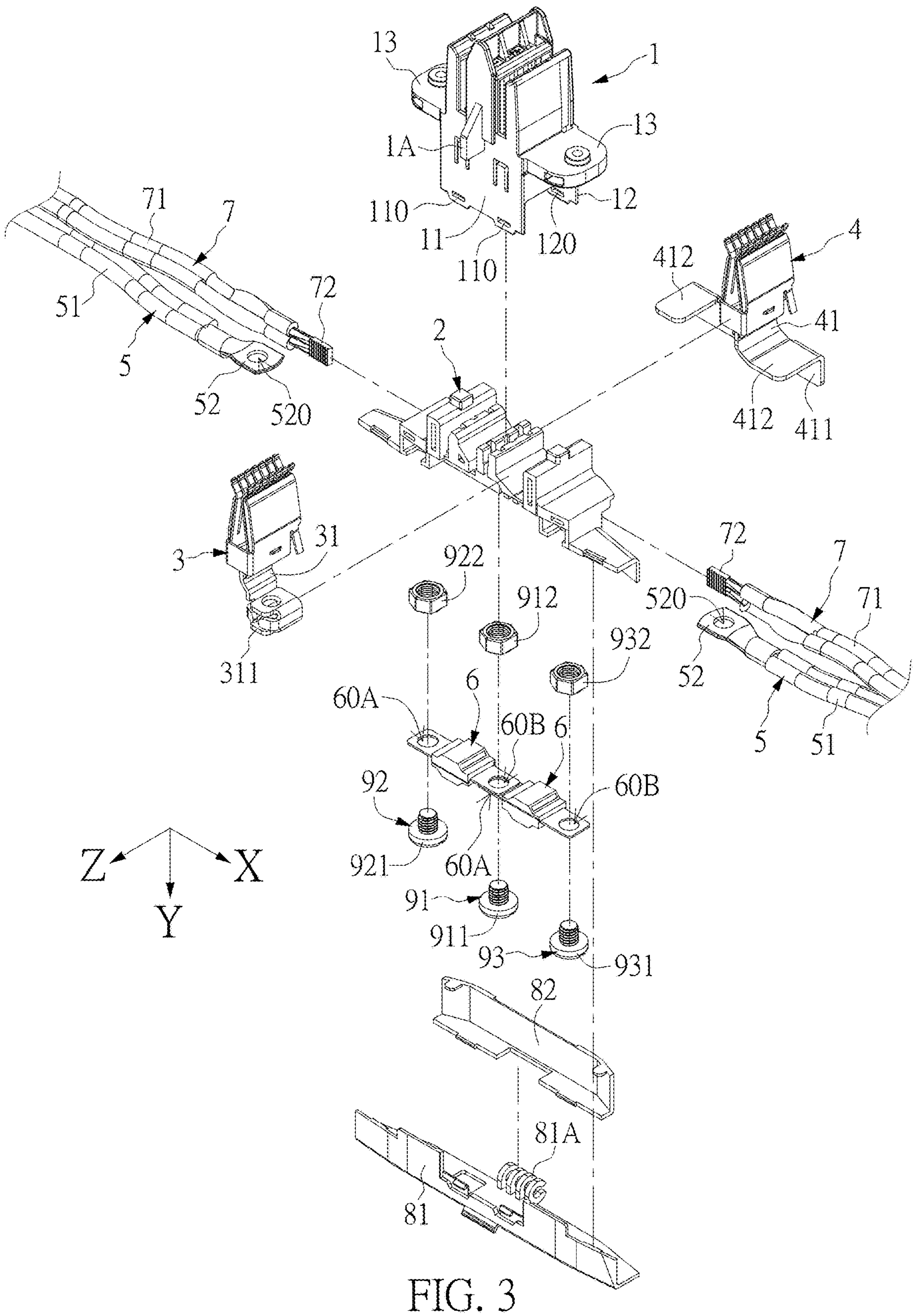
FIG. 3 is a schematic exploded view of the bus bar connector having the replaceable fuse according to the first embodiment of the present disclosure.

Referring to FIG. 1 to FIG. 3, the first embodiment of the present disclosure provides a bus bar connector M1 having a replaceable fuse, which includes a casing 1, a fixed frame 2, a first terminal assembly 3, a second terminal assembly 4, at least one first cable assembly 5, at least one fuse element 6 and at least one second cable assembly 7. In this embodiment, the number of the first cable assembly 5, the fuse element 6 and the second cable assembly 7 is two. It is worth mentioning that the bus bar connector M1 provided by the present disclosure and the bus bar connectors M2, M3 and M4 in the following embodiments are mainly side-out type bus bar connectors.

The casing 1 includes a first casing wall 11, a second casing wall 12, and two wings 13 respectively disposed between the first casing wall 11 and the second casing wall 12. The first casing wall 11 has two first slot holes 110, the second casing wall 12 has two second slot holes 120, and each wing portion 13 has a positioning hole 130 formed on the bottom thereof. In addition, the casing 1 further has two socket openings 10 (such as two socket portions) formed on the front side of the bus bar connector M1, and the fixed frame 2 is disposed on the opposite side (i.e., the rear side of the bus bar connector M1) opposite to the side where the two socket openings 10 are formed. The first terminal assembly 3 and the second terminal assembly 4 are disposed inside the casing 1. The two fuse elements 6 are disposed on the fixed frame 2. One end of each first cable assembly 5 is fixed on the fixed frame 2 and is electrically connected to the first terminal assembly 3 through the two fuse elements 6. The two first cable assemblies 5 are respectively extended from two sides of the fixed frame 2. One end of each second cable assembly 7 is disposed in the fixed frame 2 and is electrically connected to the second terminal assembly 4. The two second cable assemblies 7 are respectively extended from the two sides of the fixed frame 2. For simplification of the schematic drawings, the first cable assembly 5 and the second cable assembly 7 are omitted in FIG. 1 to FIG. 2.

Figure 4:
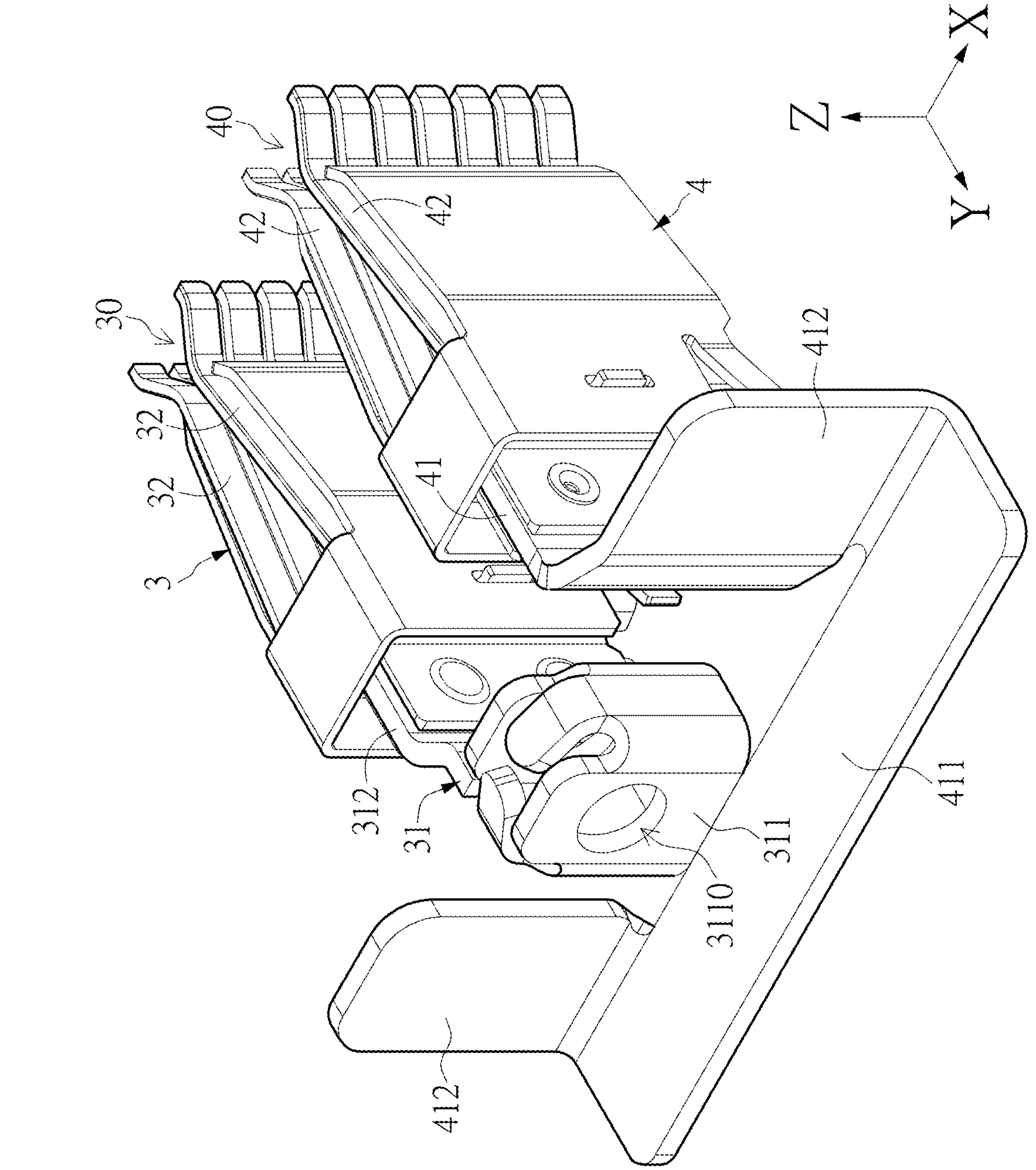
FIG. 4 is a schematic perspective view of a first terminal assembly and a second terminal assembly of the bus bar connector having the replaceable fuse according to the first embodiment of the present disclosure.

Referring to FIG. 3 and FIG. 4, the first terminal assembly 3 includes a first connecting element 31 and plural first resilient contacts 32, and the second terminal assembly 4 includes a second connecting element 41 and plural second resilient contacts 42. The first resilient contacts 32 are respectively disposed at one of two opposite sides to form a first interface 30 (such as a clamping portion), and the second resilient contacts 42 are respectively disposed at one of two opposite sides to form a second interface 40 (such as a clamping portion). The first resilient contacts 32 and the second resilient contacts 42 are disposed in the casing 1, so that the first interface 30 can be communicated with one of the socket openings 10 and the second interface 40 can be communicated with the other socket opening 10. The first connecting element 31 includes a first receiving portion 311, and the first connecting element 31 further includes at least one first through hole 3110 at the position of the first receiving portion 311. The second connecting element 41 includes a cable connecting portion 411 and two positioning portions 412.

Figure 5:
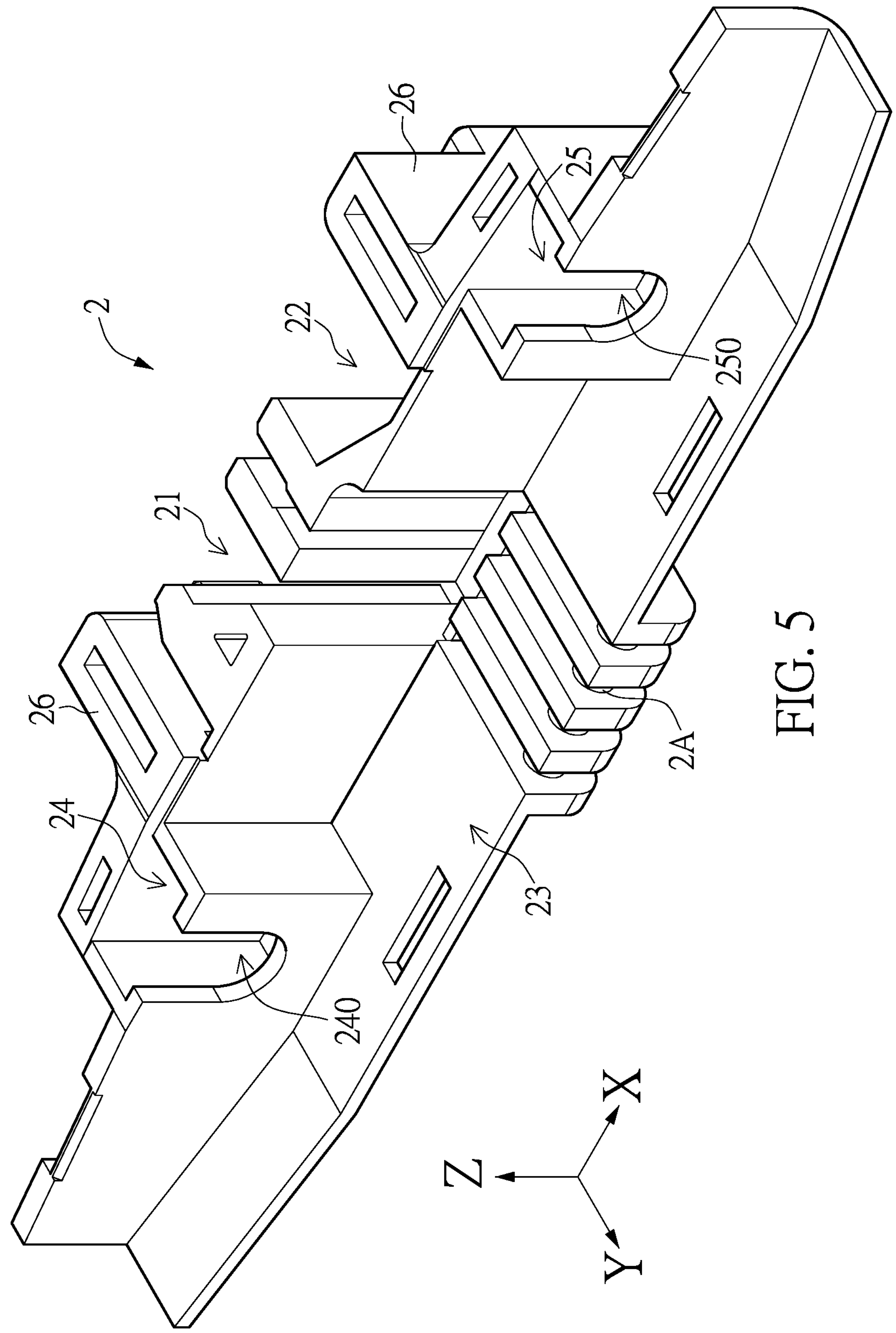
FIG. 5 is a schematic perspective view of a fixed frame of the bus bar connector having the replaceable fuse according to the first embodiment of the present disclosure.

Referring to FIG. 5, the fixed frame 2 can be configured to form a first accommodating portion 21, a second accommodating portion 22 and a third accommodating portion 23. The first accommodating portion 21 and the second accommodating portion 22 are located on the same side of the third accommodating portion 23. The fixed frame 2 has a shaft post 2A on one side of the third accommodating portion 23, and the fixed frame 2 further includes two abutting portions 26. The two abutting portions 26 also respectively have two guiding grooves (not shown). In addition, the fixed frame 2 also has a second receiving portion 24 and a third receiving portion 25, and both the second receiving portion 24 and the third receiving portion 25 are communicated with the third accommodating portion 23.

Continuing to referring to FIG. 5, the first connecting element 31 of the first terminal assembly 3 is inserted into the first accommodating portion 21 along the negative Z-axis direction. The first connecting element 31 has a first end portion and a second end portion. The first end portion is a connecting portion 312, which is electrically connected to the first resilient contacts 32. The second end portion is the first receiving portion 311 formed by bending, which extends to the third accommodating portion 23 and is adjacent to the shaft post 2A. The second connecting element 41 of the second terminal assembly 4 is inserted into the second accommodating portion 22 along the positive Z-axis direction, and the two positioning portions 412 are respectively disposed in two guiding grooves of the two abutting portions 26 (not shown). At this time, the connecting portion 411 is located on the back side of the third accommodating portion 23.

Continuing to refer to FIG. 1 to FIG. 3, each first cable assembly 5 includes a first cable body 51 and a cable connection portion 52 connected to one side of the first cable body 51. The two fuse elements 6 are disposed in the third accommodating portion 23. Each fuse element 6 include a first fixing hole 60A (such as a screw hole) and a second fixing hole 60B (such as a screw hole) respectively disposed on two ends thereof. Each cable connection portion 52 includes a through hole 520. Referring to FIG. 5, the second receiving portion 24 further includes at least one second through hole 240, and the third receiving portion 25 further includes at least one third through hole 250. In this embodiment, the number of the first through holes 3110 is two, and the number of the second through hole 240 and the third through hole 250 is one, but it is not meant to limit the scope of the present disclosure. As shown in FIG. 3, the two fuse elements 6 are disposed in series. Therefore, the second fixing hole 60B of one of the fuse elements 6 overlaps with the first fixing hole 60A of the other fuse element 6.

Based on the above description, the bus bar connector M1 further includes a first screwing element 91, a second screwing element 92 and a third screwing element 93. The first screwing element 91 includes a screw 911 and a nut 912, the second screwing element 92 includes a screw 921 and a nut 922, and the third screwing element 93 includes a screw 931 and a nut 932. The three nuts 912, 922 and 932 are respectively disposed in the first receiving portion 311, the second receiving portion 24 and the third receiving portion 25.

Continuing to refer to FIG. 2, when the first screwing element 91, the second screwing element 92 and the third screwing element 93 are configured to fix the two fuse elements 6 and the two first cable assemblies 5, the first screwing element 91 is connected with the two fuse elements 6. Specifically, the screw 911 of the first screwing element 91 passes through the first fixing hole 60A of one of the fuse elements 6, the second fixing hole 60B of the other fuse element 6 and the first through hole 3110 of the second section 3113 so as to combine with the nut 912. The second screwing element 92 is connected between one of the fuse elements 6 and one of the cable connection portions 52, and the third screwing element 93 is connected between the other fuse element 6 and the other cable connection portion 52. Specifically, the screw 921 of the second screwing element 92 passes through the first fixing hole 60A of one of the fuse elements 6, the through hole 520 of one of the cable connection portions 52 and the second through hole 240 of the second receiving portion 24 so as to combine with the nut 922. The screw 931 of the third screwing element 93 passes through the second fixing hole 60B of the other fuse element 6, the through hole 520 of the other cable connection portion 52 and the third through hole 250 of the third receiving portion 25 so as to combine with the nut 932. Therefore, the two fuse elements 6 are connected in series between the two cable connection portions 52 and are electrically connected to the first connecting element 31. It should be noted that, when the screw 921 is combined with the nut 922, it will clamp a part of the fixed frame 2 in the second receiving portion 24; similarly, when the screw 931 is combined with the nut 932, it will also clamp a part of the fixed frame 2 in the third receiving portion Therefore, the second screwing element 92 and the third screwing element 93 are not only used to connect the two fuse elements 6 and the two cable connection portions 52, but also are configured to fix the two fuse elements 6 and the two cable connection portions 52 on the fixed frame 2.

In addition, the bus bar connector M1 further includes a first cover 81, one side of the first cover 81 is provided with a pivot portion 81A and the other side of the first cover 81 is provided with two first retaining portion 811. The first cover 81 is pivotally connected to the shaft post 2A of the fixed frame 2 through the pivot portion 81A, so that the first cover 81 can pivot around the shaft post 2A to perform opening and closing actions. It is worth mentioning that, as shown in FIG. 2, when the bus bar connector M1 of the present disclosure is inserted into the server device, a convex portion 1A located on the first casing wall 11 of the casing 1 is upward (i.e., the positive Z-axis direction), the second casing wall 12 of the casing 1 faces the circuit board of the server device, and the shaft post 2A and the pivot portion 81A are adjacent to the second casing wall 12. Thereby, the opening direction of the first cover 81 is from top to bottom so as to prevent the two fuse elements 6 from being blocked by the first cover 81 (that is to say, the user will not be blocked by the first cover 81) when replacing the two fuse elements 6 by the user.

In addition, referring to FIG. 1, the first cover 81 and the fixed frame 2 collectively form two first lateral outlets 80A, and the two first lateral outlets 80A are respectively located on the left and right sides of the bus bar connector M1. On the other hand, the two first lateral outlets 80A are correspondingly located on the left and right sides of the casing 1, respectively. The two first cable bodies 51 respectively pass through the two first lateral outlets 80A and extend outwardly from both sides of the third accommodating portion 23. The first cover 81 is configured to cover the two fuse elements 6 and the two cable connection portions 52, and the first cover 81 is provided with two openings 810, and the two openings 810 respectively correspond to the two fuse elements 6 (i.e., each openings 810 respectively expose at least one portion of the corresponding fuse elements 6), so that the heat dissipation effect of the two fuse elements 6 during operation is better. In addition, when the first cover 81 is pivoted relative to the fixed frame 2 to be closed, the two first retaining portions 811 are respectively and detachably retained in the two first slot holes 110. Moreover, a pressing element 812 and the two first retaining portions 811 are disposed on the same side, and the user can press the pressing element 812 to open the first cover 81.

Continuing to refer to FIG. 3, each second cable assembly 7 is electrically connected to the cable connecting portion 411 of the second connecting element 41. Each second cable assembly 7 includes a second cable body 71 and a cable connection portion 72 connected to one side of the second cable body 71, and the two cable connection portions 72 are respectively electrically connected to the cable connecting portion 411 of the second connecting element 41. And the two second cable bodies 71 are respectively extended from two sides of the fixed frame 2. In addition, the bus bar connector M1 further includes a second cover 82. The second cover 82 is configured to cover the cable connecting portion 411 and the two cable connection portions 72.

Second Embodiment

Figure 6:
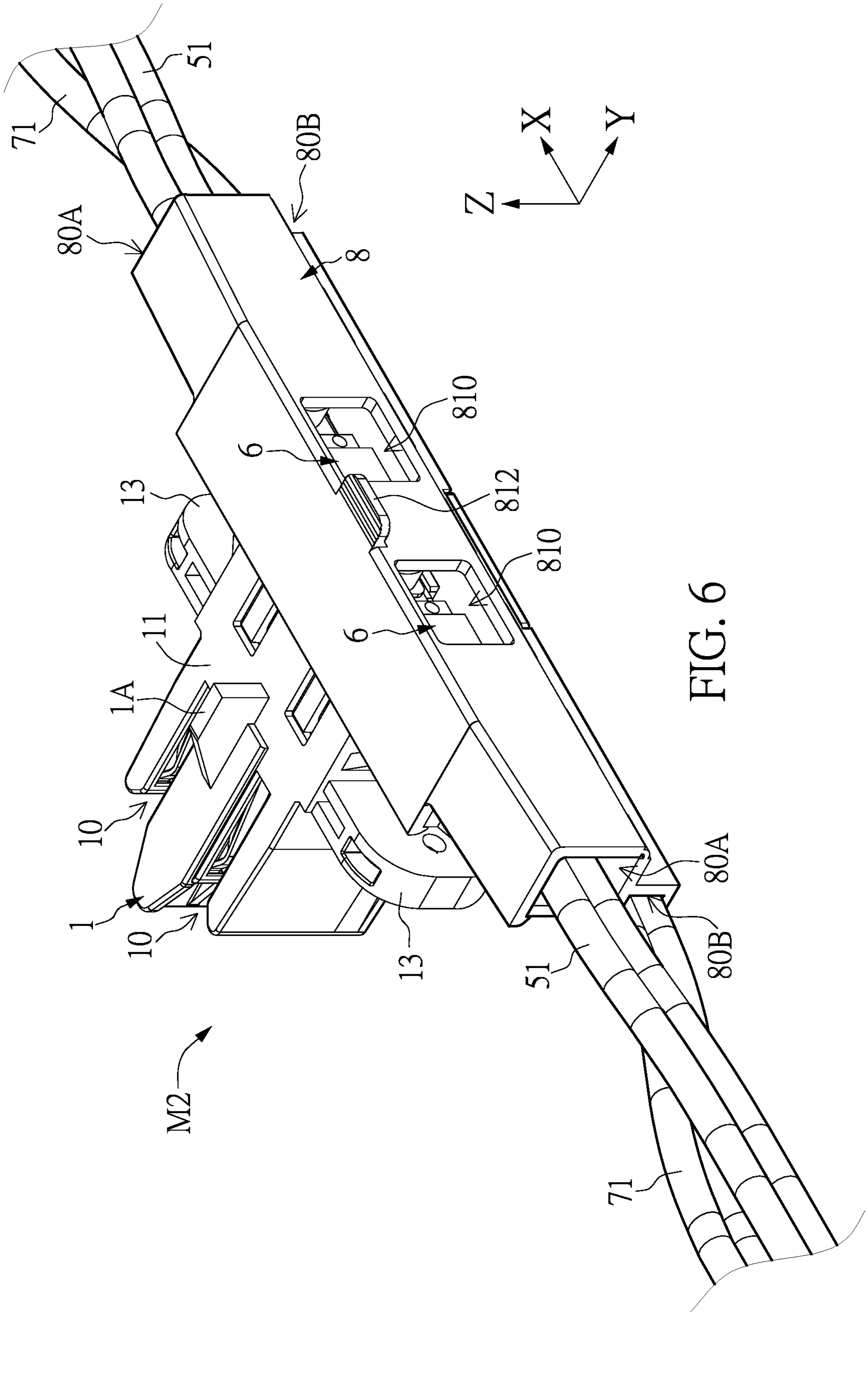
FIG. 6 is a schematic perspective view of the bus bar connector having the replaceable fuse according to a second embodiment of the present disclosure.
Figure 7:
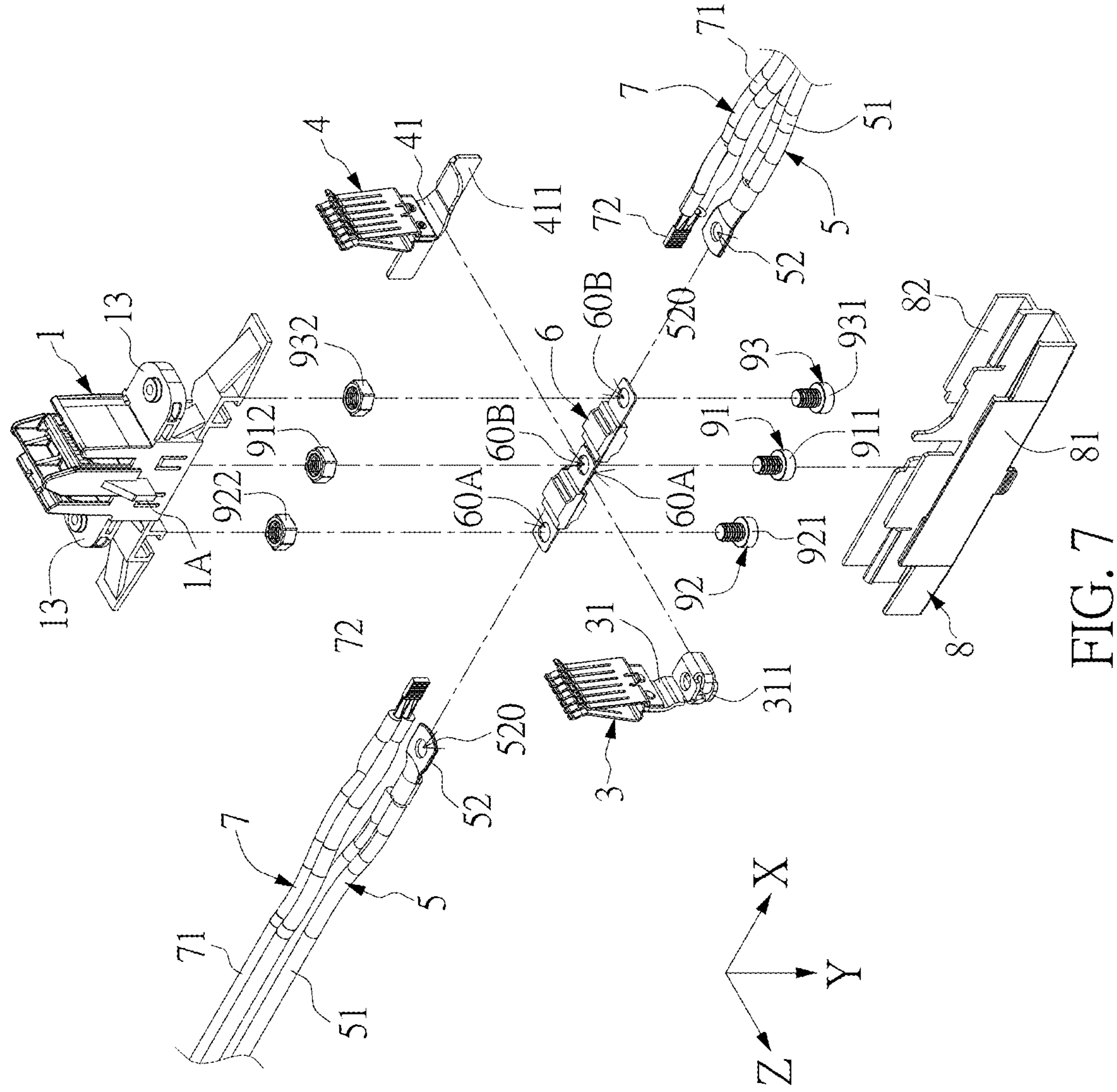
FIG. 7 is a schematic exploded view of the bus bar connector having the replaceable fuse according to the second embodiment of the present disclosure.

Referring to FIG. 6 and FIG. 7, a third embodiment of the present disclosure provides a bus bar connector M2 having a replaceable fuse. The main difference between this embodiment and the first embodiment is that the bus bar connector M2 of this embodiment can be provided without a fixed frame. The bus bar connector M2 includes a casing 1, a first terminal assembly 3, a second terminal assembly 4, at least one first cable assembly 5, at least one fuse element 6 and at least one second cable assembly 7. Each least one first cable assembly 5 includes a first cable body 51 and a cable connection portion 52. The cable connection portion 52 is connected to one side of the first cable body 51. Each least one second cable assembly 7 includes a second cable body 71 and a cable connection portion 72. The cable connection portion 72 is connected to one side of the second cable body 71.

In this embodiment, the number of the first cable assembly 5, the fuse element 6 and the second cable assembly 7 is two. The two first cable assemblies 5 respectively extend from two sides of the casing 1.

Figure 8:
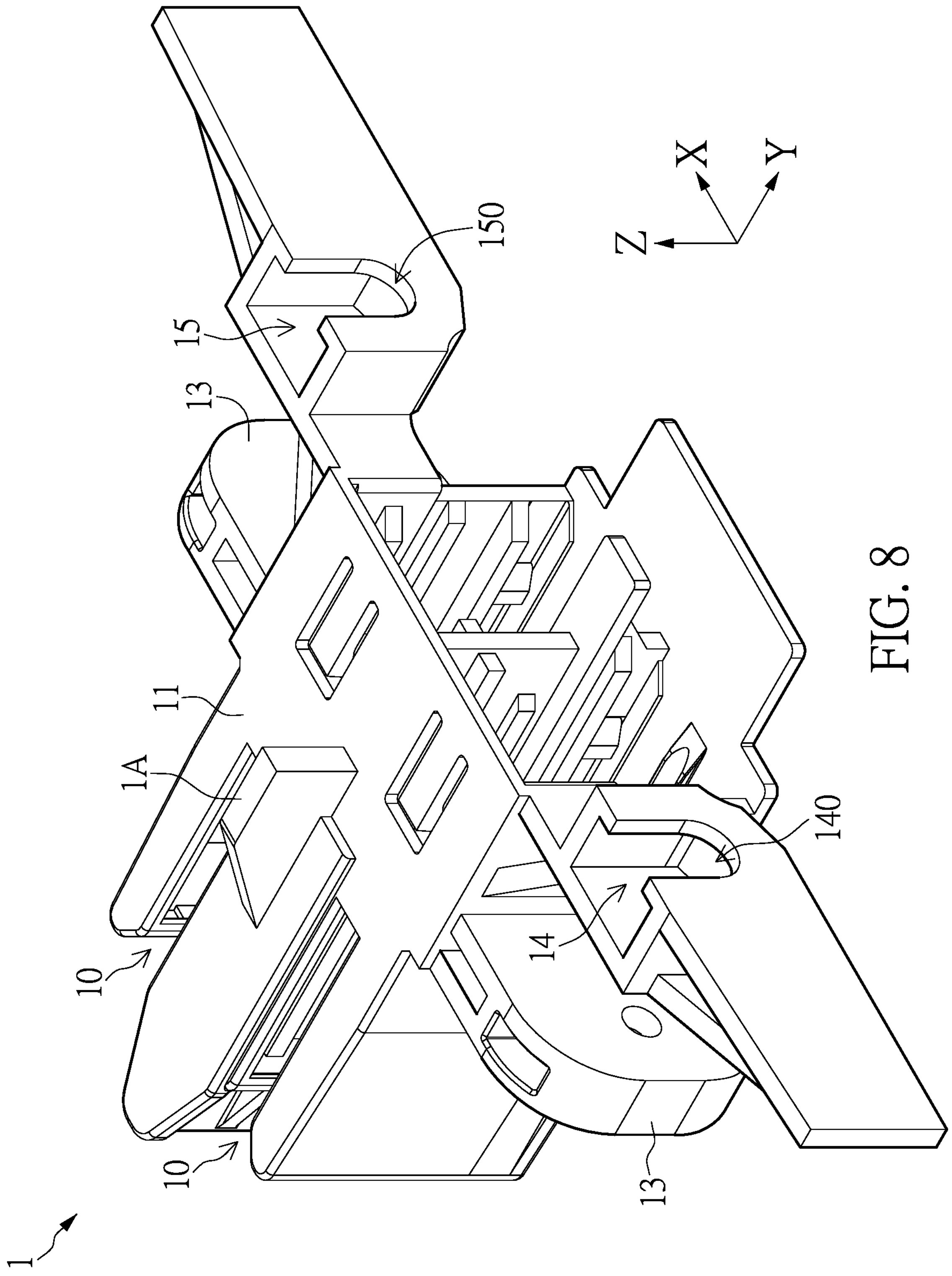
FIG. 8 is a schematic perspective view of a casing of the bus bar connector having the replaceable fuse according to the second embodiment of the present disclosure.
Figure 9:
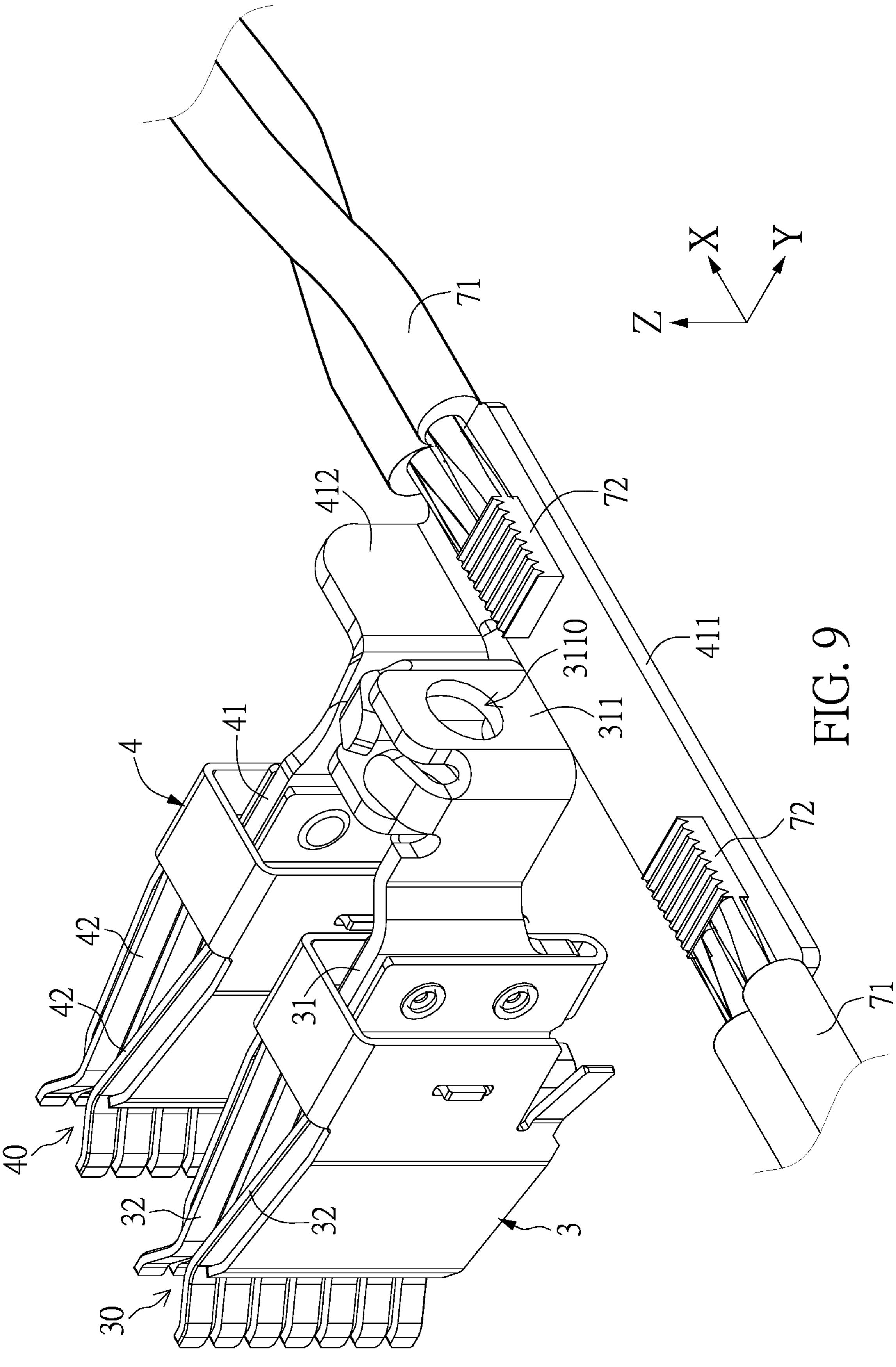
FIG. 9 is a schematic view of the first terminal assembly and the second terminal assembly of the bus bar connector connected to a second cable body according to the second embodiment of the present disclosure.

Referring to FIG. 8 and FIG. 9, the casing 1 includes a first casing wall 11 and two wings 13 respectively disposed on both sides of the first casing wall 11. The casing 1 has two socket openings 10 formed on the front side of the bus bar connector M2. The first terminal assembly 3 and the second terminal assembly 4 are disposed inside the casing 1. The first terminal assembly 3 includes a first connecting element 31 and plural first resilient contacts 32, and the second terminal assembly 4 includes a second connecting element 41 and plural second resilient contacts 42. The first resilient contacts 32 are respectively disposed at one of two opposite sides to form a first interface 30, and the second resilient contacts 42 are respectively disposed at one of two opposite sides to form a second interface 40.

The first connecting element 31 is formed by stamping and bending a metal piece. The structure and shape of the first connecting element 31 are the same as those in the first embodiment, which will not be repeated below. One end of the first connecting element 31 is connected with the first resilient contacts 32, and the other end of the first connecting element 31 is bent to form a first receiving portion 311. The two first cable assemblies 5 are electrically connected to the first connecting element 31 through the two fuse elements 6, respectively. In this embodiment, at least one fuse element 6 is connected in series between the cable connection portions 52 and connected with the first receiving portion 311 of the first connecting element 31.

The second connecting element 41 is also formed by stamping and bending a metal piece, one end of the second connecting element 41 is connected with the second resilient contacts 42, and the other end of the second connecting element 41 is extended to form a cable connecting portion 411. Furthermore, comparing FIG. 4 of the first embodiment with FIG. 9 of the present embodiment, the second connecting element 41 of the present embodiment only has one positioning portion 412.

Referring to FIG. 7 to FIG. 9, the two cable connection portions 72 are electrically connected to the cable connecting portion 411. When the first terminal assembly 3 and the second terminal assembly 4 are disposed in the casing 1, the first resilient contacts 32 and the second resilient contacts 42 are disposed in the casing 1, so that the first interface 30 and one of the socket openings 10 are communicated with each other, and the second interface 40 and the other socket opening 10 are communicated with each other. The first receiving portion 311 of the first connecting element 31 and the second connecting element 41 are exposed on the opposite side opposite to the side where the two socket openings 10 of the casing 1 are formed.

In addition, the bus bar connector M2 further includes a first screwing element 91, a second screwing element 92 and a third screwing element 93. The first screwing element 91 is connected between the two fuse elements 6. The second screwing element 92 is connected between one of the fuse elements 6 and one of the cable connection portions 52. The third screwing element 93 is connected between the other fuse element 6 and the other cable connection portion 52. The first screwing element 91, the second screwing element 92 and the third screwing element 93 are configured to fix the two fuse elements 6 and the two first cable assemblies 5.

Figure 11:
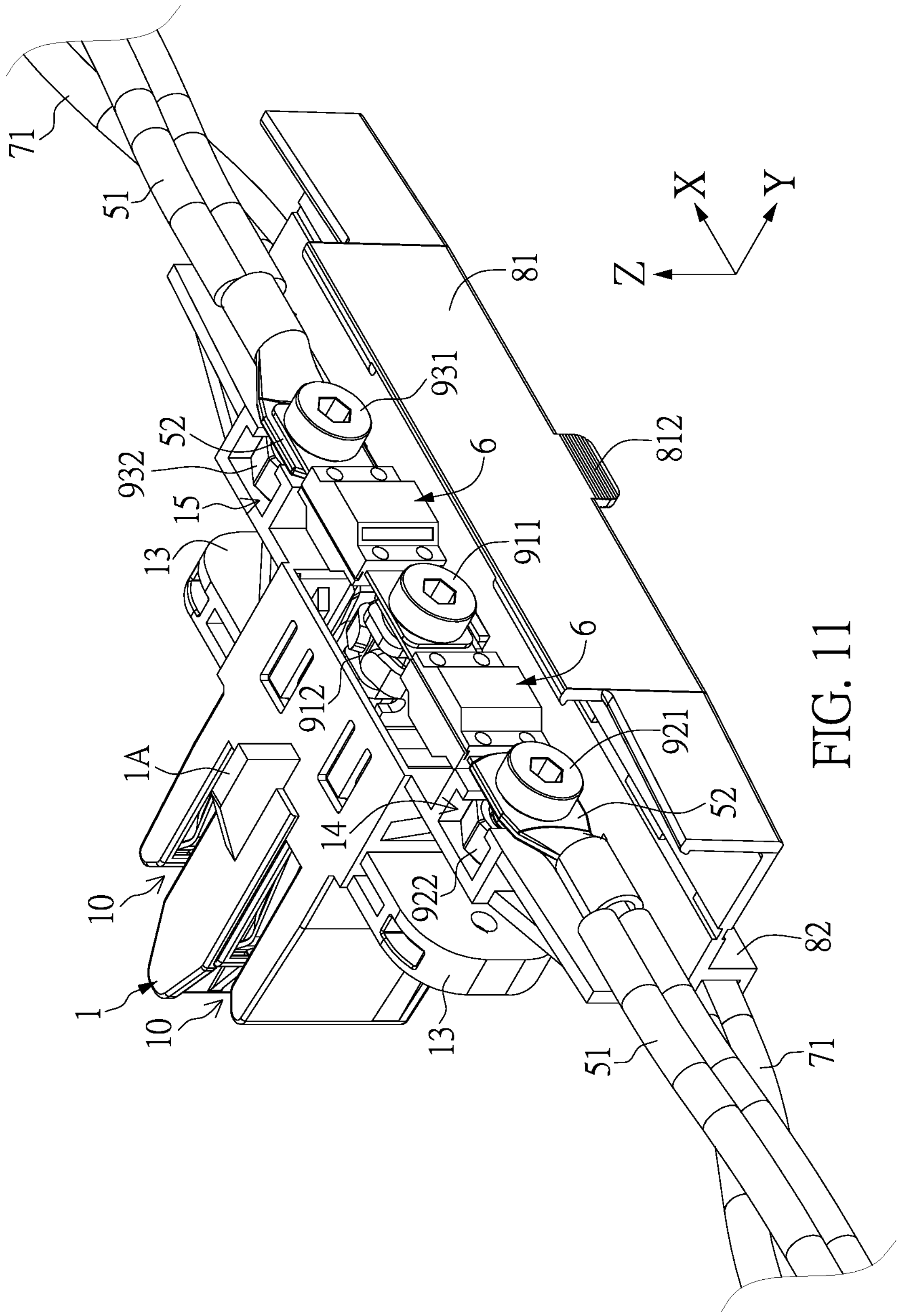
FIG. 11 is a schematic view of the protective cover of the bus bar connector having the replaceable fuse being opened according to the second embodiment of the present disclosure.

Referring to FIG. 7, FIG. 9 and FIG. 11, the casing 1 further includes a second receiving portion 14 and a third receiving portion 15. The first screwing element 91 includes a screw 911 and a nut 912, the second screwing element 92 includes a screw 921 and a nut 922, and the third screwing element 93 includes a screw 931 and a nut 932. The nut 912 is disposed in the first receiving portion 311, the nut 922 is disposed in the second receiving portion 14, and the nut 932 is disposed in the third receiving portion 15. Each fuse element 6 include a first fixing hole 60A and a second fixing hole 60B respectively disposed on two ends thereof, each cable connection portion 52 includes a through hole 520, the first connecting element 31 further includes at least one first through hole 3110 at the position of the first receiving portion 311, the second receiving portion 14 further includes at least one second through hole 140, and the third receiving portion 15 further includes at least one third through hole 150. In this embodiment, the number of the first through holes 3110 is two, and the number of the second through holes 140 and the third through holes 150 is one, but it is not meant to limit the scope of the present disclosure.

Referring to FIG. 7 and FIG. 11, the two fuse elements 6 are disposed in series. Therefore, the second fixing hole 60B of one of the fuse elements 6 overlaps with the first fixing hole 60A of the other fuse element 6. When the first screwing element 91, the second screwing element 92 and the third screwing element 93 are configured to fix the two fuse elements 6 and the first cable assemblies 5, the screw 911 of the first screwing element 91 passes through the first fixing hole 60A of one of the fuse elements 6, the second fixing hole 60B of the other fuse element 6, and the first through hole 3110 so as to combine with the nut 912 of the first screwing element 91.

Based on the above description, the screw 921 of the second screwing element 92 passes through the first fixing hole 60A of one of the fuse elements 6, the through hole 520 of one of the cable connection portions 52, and the second through hole 140 so as to combine with the nut 922 of the second screwing element 92. The screw 931 of the third screwing element 93 passes through the second fixing hole 60B of the other fuse element 6, the through hole 520 of the other cable connection portion 52, and the third through hole 150 so as to combine with the nut 932 of the third screwing element 93.

Figure 10:
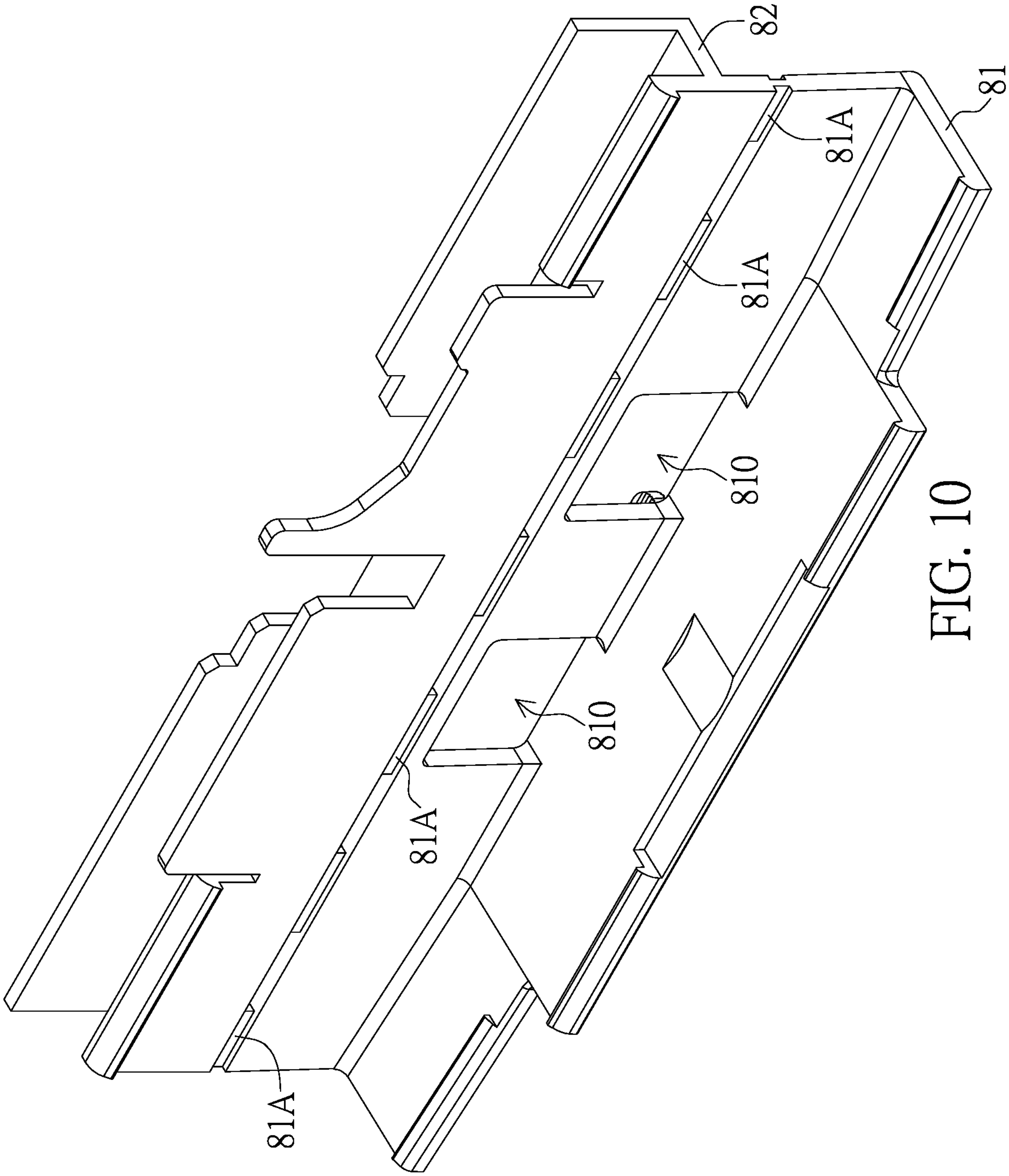
FIG. 10 is a schematic perspective view of a protective cover of the bus bar connector having the replaceable fuse according to the second embodiment of the present disclosure.

Referring to FIG. 10 to FIG. 11, the bus bar connector M2 further includes a protective cover 8, and the protective cover 8 is disposed on the opposite side (i.e., the rear side of the bus bar connector M2) opposite to the side where the two socket openings 10 of the casing 1 are formed. The protective cover 8 has two openings 810 to expose the fuse elements for heat dissipation and confirming if suitable fuse elements are assembled. The protective cover 8 includes a first cover 81 and a second cover 82. The first cover 81 has a plurality of pivot portions 81A disposed on one side thereof. The first cover 81 is pivotally connected to the second cover 82 through the pivot portions 81A, so that the first cover 81 can pivot relative to the second cover 82 to perform opening and closing actions. The first cover 81 is configured to cover the two fuse elements 6. The first cover 81 has two first lateral outlets 80A respectively formed on both sides thereof, and the second cover 82 has two second lateral outlets 80B respectively formed on both sides thereof. The two first cable bodies 51 respectively pass through the two first lateral outlets 80A, and the two second cable bodies 71 respectively pass through the two second lateral outlets 80B.

Third Embodiment

Figure 12:
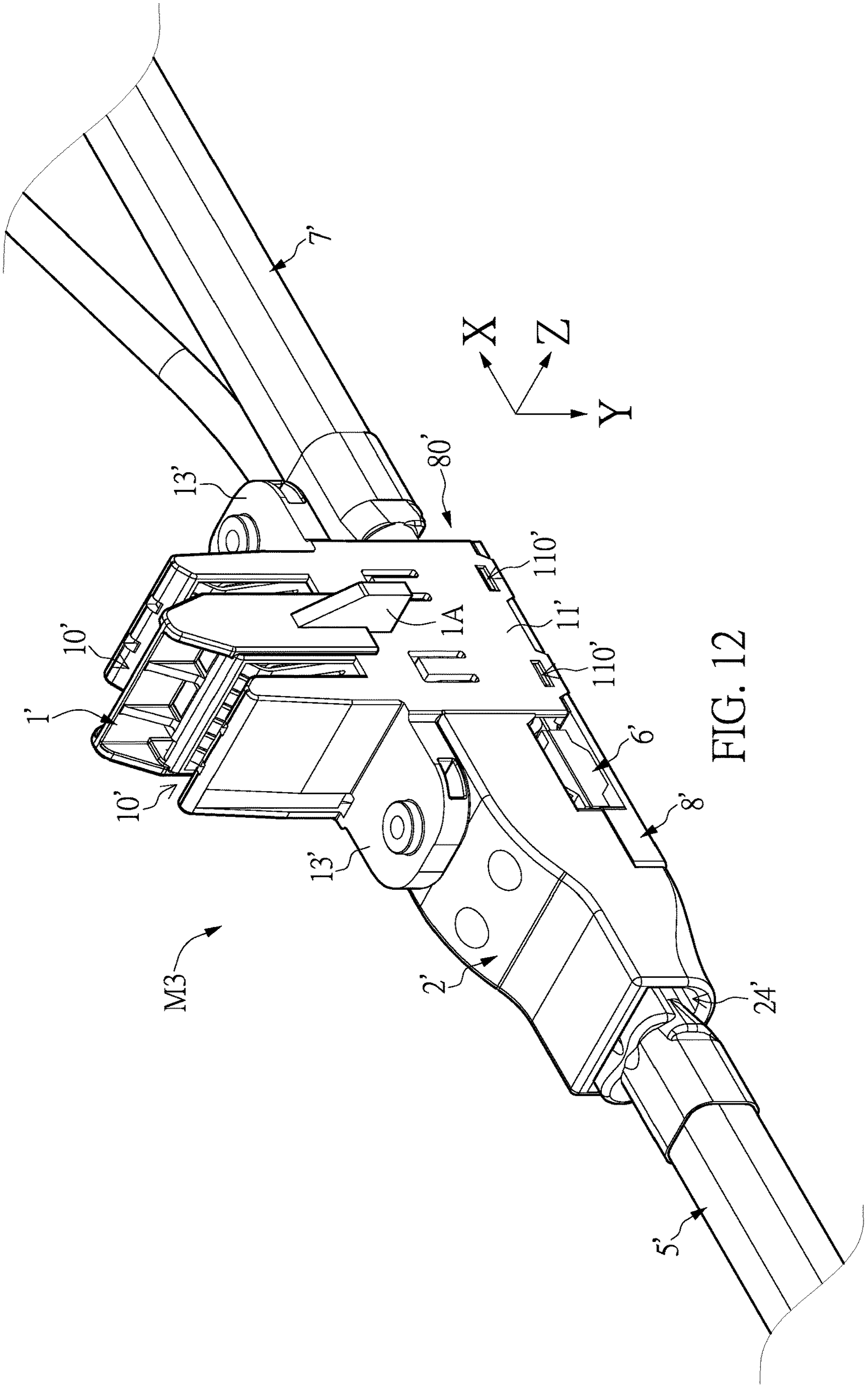
FIG. 12 is a schematic perspective view of the bus bar connector having the replaceable fuse according to a third embodiment of the present disclosure.
Figure 13:
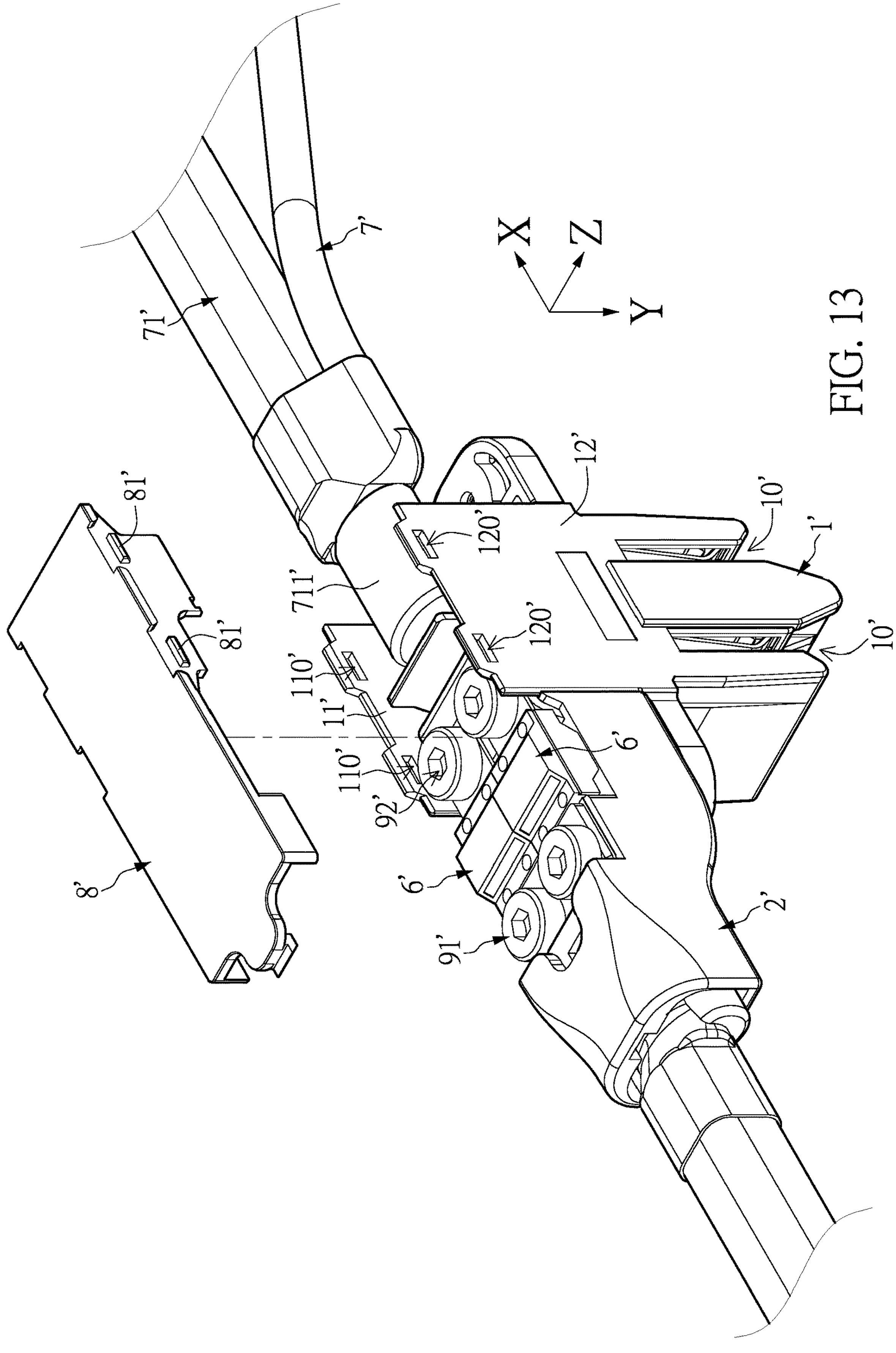
FIG. 13 is a partial schematic exploded view of the bus bar connector having the replaceable fuse according to the third embodiment of the present disclosure.

Referring to FIG. 12 to FIG. 13, a third embodiment of the present disclosure provides a bus bar connector M3 having a replaceable fuse, which includes a casing 1', a fixed frame 2', a first terminal assembly 3', a second terminal assembly 4', a first cable assembly 5', two fuse elements 6' and a second cable assembly 7'.

The casing 1' includes a first casing wall 11', a second casing wall 12', and two wings 13' respectively disposed between the first casing wall 11' and the second casing wall 12'. The first casing wall 11' has a plurality of first slot holes 110', and the second casing wall 12' has a plurality of second slot holes 120'. In addition, the casing 1' also forms two socket openings 10' on the front side of the bus bar connector M3, and the fixed frame 2' is disposed on one side of the casing 1' (i.e., the rear side of the bus bar connector M3). The first terminal assembly 3' and the second terminal assembly 4' are disposed inside the casing 1'. The two fuse elements 6' are disposed on the fixed frame 2'. One end of the first cable assembly 5' is fixed on the fixed frame 2' and is electrically connected to the first terminal assembly 3' through the two fuse elements 6'. One end of the second cable assembly 7' is disposed in the fixed frame 2' and is electrically connected to the second terminal assembly 4'.

Figure 14:
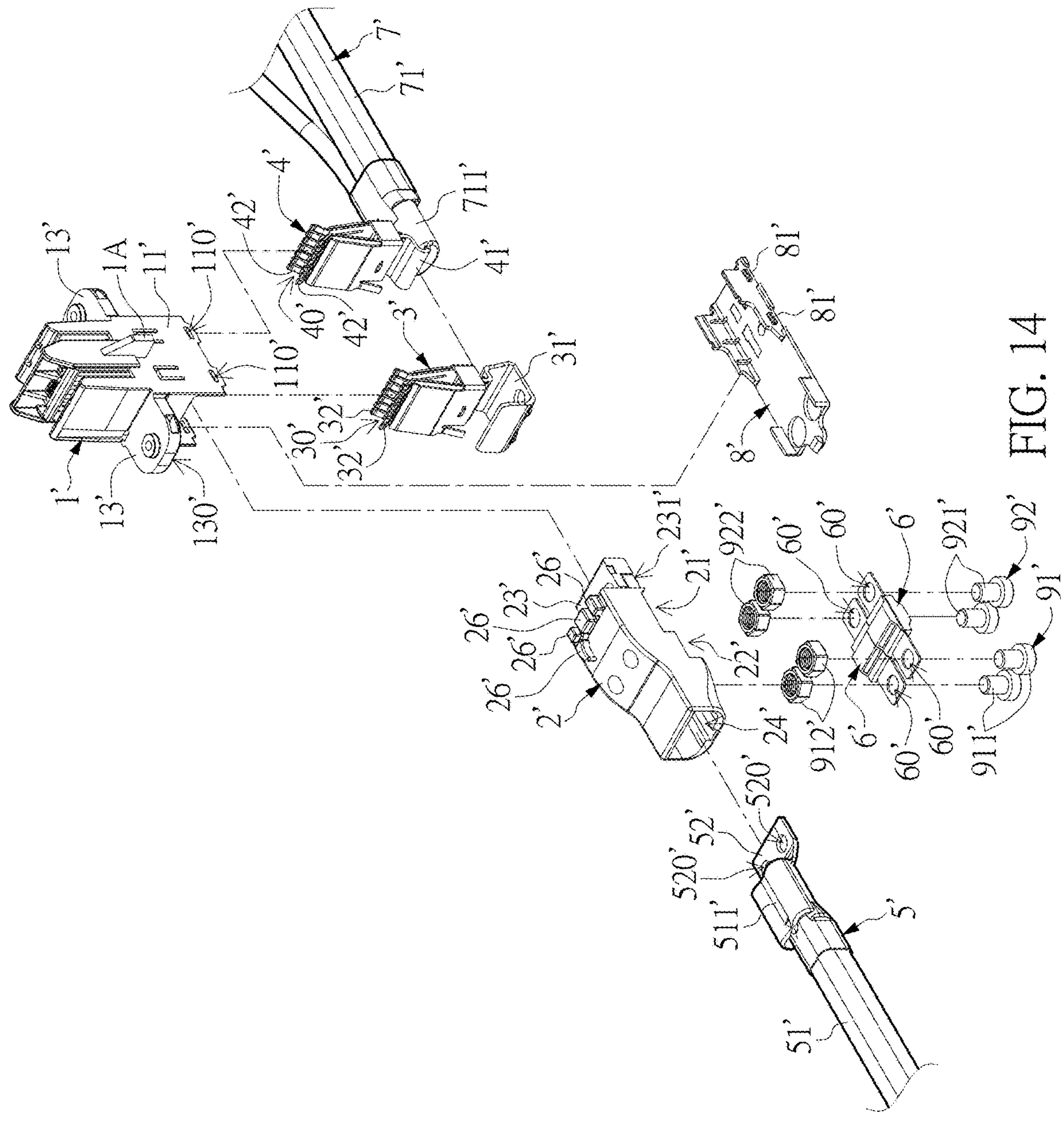
FIG. 14 is a schematic exploded view of the bus bar connector having the replaceable fuse according to the third embodiment of the present disclosure.
Figure 15:
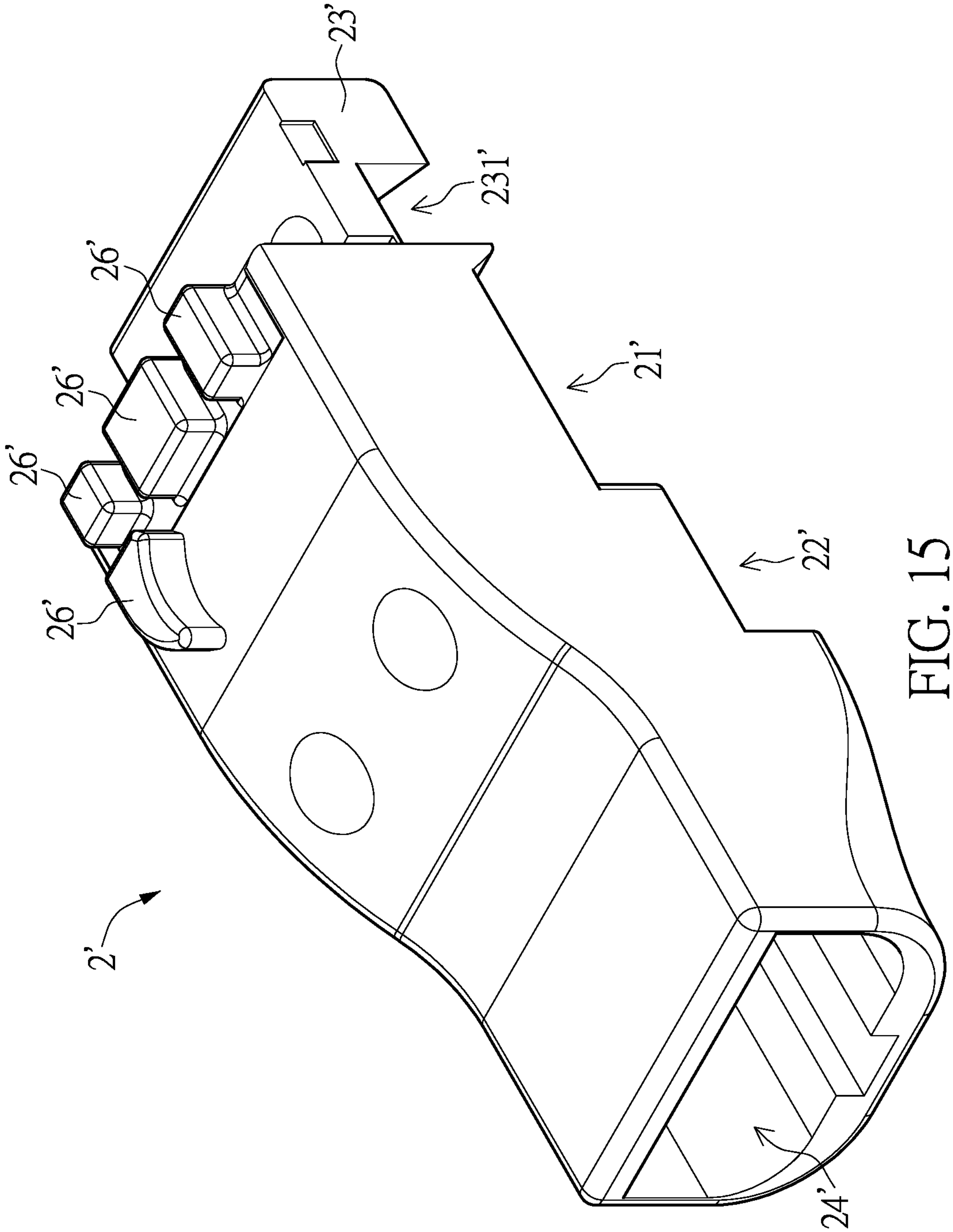
FIG. 15 is a schematic perspective view of the fixed frame of the bus bar connector having the replaceable fuse according to the third embodiment of the present disclosure.
Figure 16:
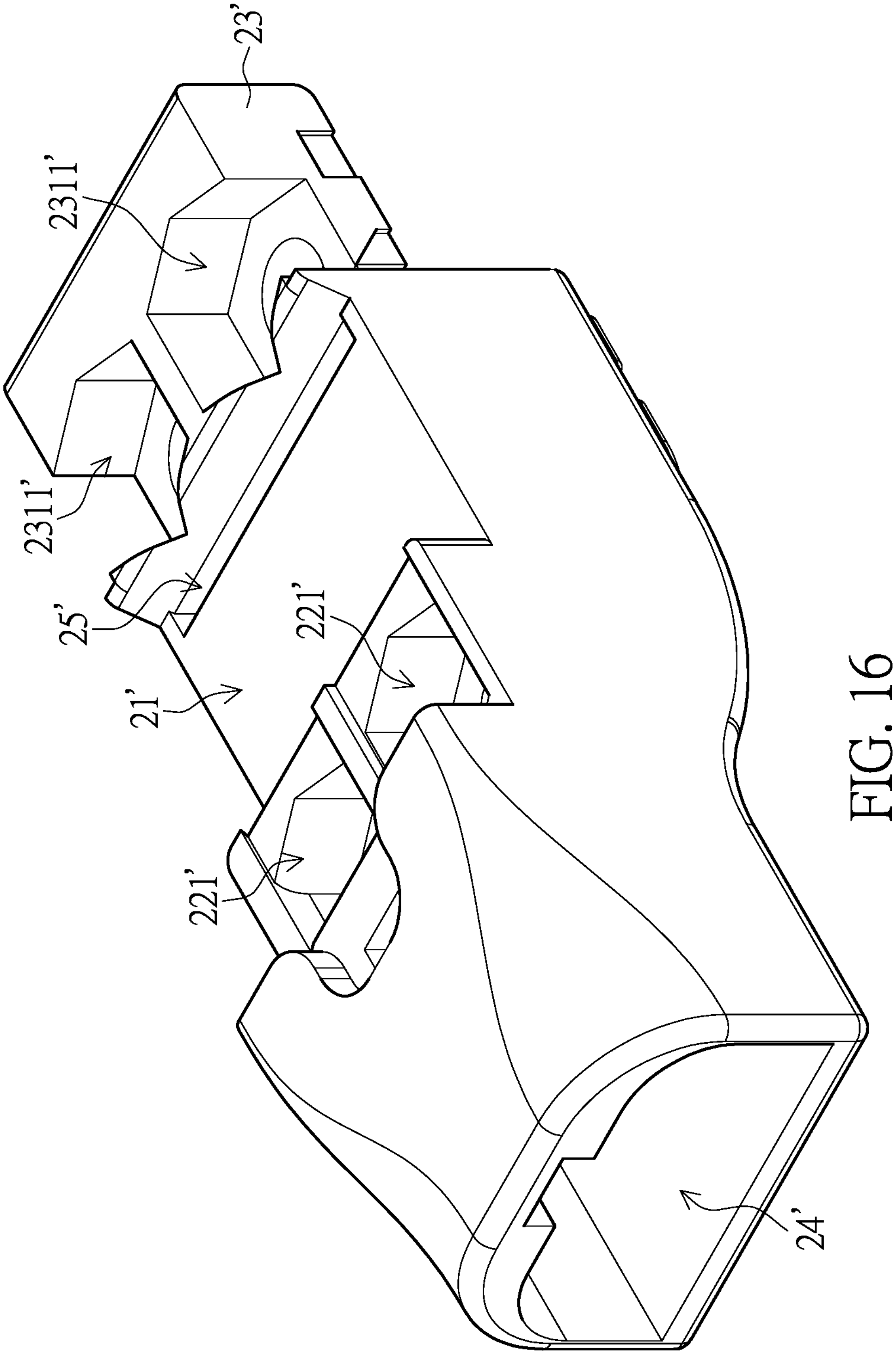
FIG. 16 is another schematic perspective view of the fixed frame of the bus bar connector having the replaceable fuse according to the third embodiment of the present disclosure.

Referring to FIG. 12 and FIG. 14 to FIG. 16, the bottom of the fixed frame 2' forms an accommodating portion 21' and a first receiving portion 22'. The fixed frame 2' also has a stepped portion 23', and the stepped portion 23' is disposed on one side of the fixed frame 2' and is adjacent to the accommodating portion 21'. The bottom of the stepped portion 23' forms a second receiving portion 231', and the accommodating portion 21' is located between the first receiving portion 22' and the second receiving portion 231'. The first receiving portion 22' includes two first accommodating grooves 221', and the second receiving portion 231' includes two second accommodating grooves 2311'. The fixed frame 2' also forms a first lateral outlet 24' on the opposite side opposite to the side where the stepped portion 23' is formed, and the fixed frame 2' also forms a slot 25' between the accommodating portion 21' and the stepped portion 23'. As shown in FIG. 12, the first lateral outlet 24' is located on one of the left and right sides of the bus bar connector M3. In addition, as shown in FIG. 15, the fixed frame 2' further includes a plurality of positioning posts 26'. The positioning posts 26' are formed on the top of the fixed frame 2', and the positioning posts 26' have different upper surface areas or shapes. One of the two wings 13' of the casing 1' which is closer to the fixed frame 2' has a plurality of positioning holes 130'. When the fixed frame 2' is disposed on one side of the casing 1', the positioning posts 26' are respectively inserted into the positioning holes 130' so as to position the fixed frame 2' on the casing 1'.

Continuing to refer to FIG. 14, the first terminal assembly 3' includes a first connecting element 31' and plural first resilient contacts 32', and the second terminal assembly 4' includes a second connecting element 41' and plural second resilient contacts 42'. The first resilient contacts 32' are respectively disposed at one of two opposite sides to form the first interface 30', and the second resilient contacts 42' are respectively disposed at two opposite sides to form the second interface 40'.

Figure 17:
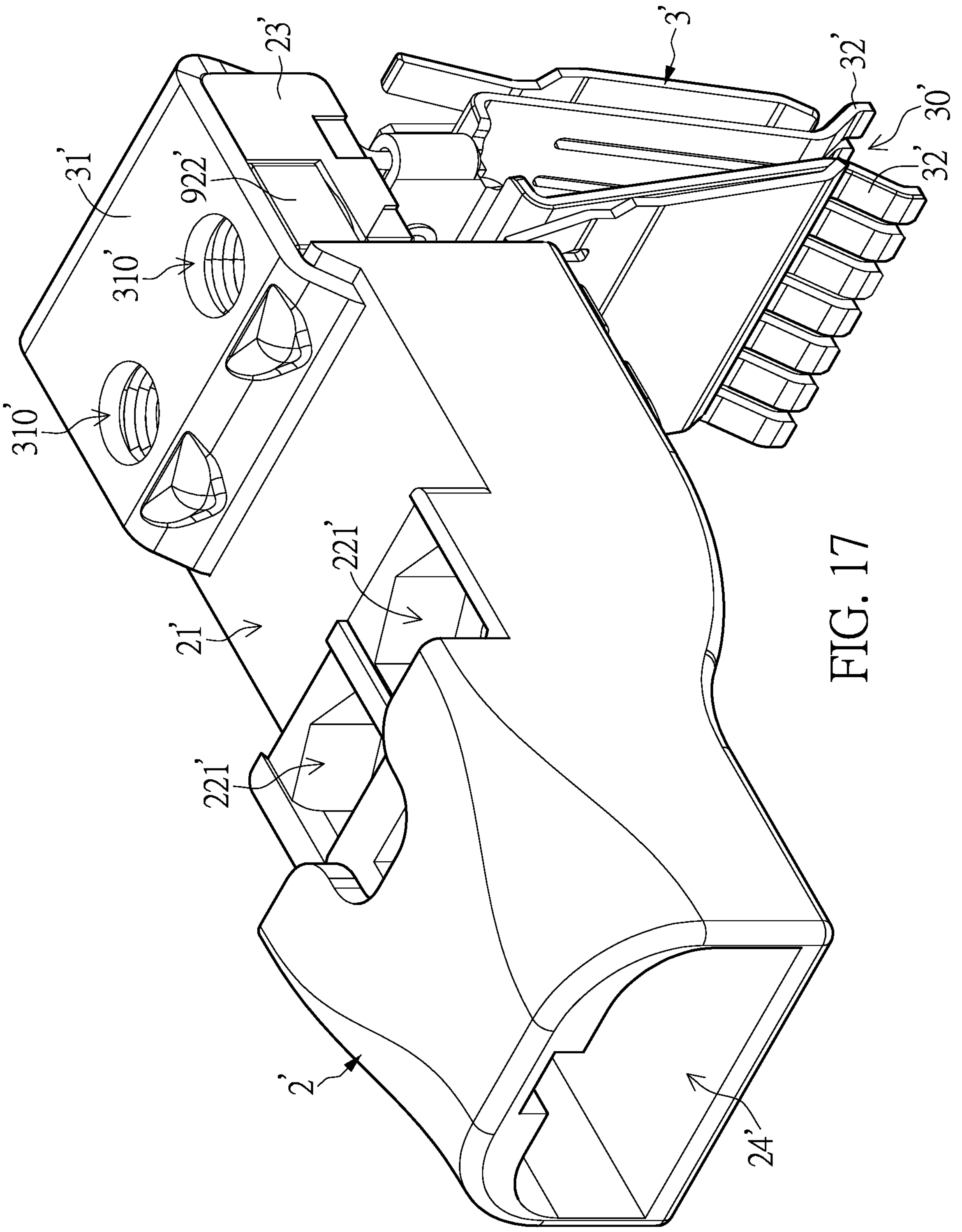
FIG. 17 is another schematic assembled view of the first terminal assembly and the fixed frame of the bus bar connector having the replaceable fuse according to the third embodiment of the present disclosure.

Referring to FIG. 17, one end of the first connecting element 31' is connected with the first resilient contacts 32', the first connecting element 31' extends around the stepped portion 23', and the other end of the first connecting element 31' is inserted into the slot 25'. In addition, a part of the first connecting element 31' is located on one side of the second receiving portion 231'.

Referring to FIG. 13 and FIG. 14, the first cable assembly 5' includes a first cable body 51' and a cable connection portion 52 connected to one side of the first cable body 51'. The first cable body 51' has a first fixed portion 511', the first fixed portion 511' is disposed and limited in the first lateral outlet 24', and the cable connection portion 52' is exposed from the first receiving portion 22'. The two fuse elements 6' are disposed side by side in the accommodating portion 21', and the two fuse elements 6' are connected between the cable connection portion 52' and a part of the first connecting element 31' that is located in the second receiving portion 231'.

Continuing to refer to FIG. 13, FIG. 14 and FIG. 17, the bus bar connector M3 further includes two first screwing elements 91' and two second screwing elements 92'. Each first screwing element 91' includes a screw 911' and a nut 912'. The two nuts 912' are respectively disposed in the two first accommodating grooves 221'. Each second screwing element 92' includes a screw 921' and a nut 922'. The two nuts 922' are respectively disposed in the two second accommodating grooves 2311'. The two screws 911' pass through the two fixing holes 60' of the two fuse elements 6' and the two through holes 520' of the cable connection portion 52' so as to combine with the two nuts 912' (that is to say, each screw 911' passes through one through hole 520' and one fixing hole 60'). The two screws 921' pass through another two fixing holes 60' of the two fuse elements 6' and the two through holes 310' of the first connecting element 31' (that is to say, each screw 921' passes through one through hole 310' and one fixing hole 60') so as to combine with the nut 922' of the second screwing element 92'. The second cable assembly 7' includes a second cable body 71', and the second cable body 71' has a second fixed portion 711'. The second fixed portion 711' is connected to one end of the second connecting element 41', and the other end of the second connecting element 41' is connected with the second resilient contacts 42'.

Continuing to refer to FIG. 12 to FIG. 14, the bus bar connector M3 further includes a protective cover 8'. The protective cover 8' is provided on the opposite side opposite to the side where the two socket openings 10' of the casing 1' are formed, and the protective cover 8' is configured to cover the two fuse elements 6' and may have at least one opening to expose the two fuse elements 6' for heat dissipation. Furthermore, the protective cover 8' and the casing 1' form a second lateral outlet 80'. The second lateral outlet 80' is located on the opposite side of the first lateral outlet 24' (i.e., another side of the left and right sides of the bus bar connector M3), so that the second fixed portion 711' of the second cable body 71' is located at the second lateral outlet and connected to the second connecting element 41'. In other words, the first cable body 51' extends from the first lateral outlet 24', and the second cable body 71' extends from the second lateral outlet 80'.

In addition, the protective cover 8' has a plurality of retaining portions 81'. When the protective cover 8' is disposed on the casing 1', the retaining portions 81' are respectively and detachably clamped or retained in the first slot holes 110' and the second slot holes 120'.

Fourth Embodiment

Figure 18:
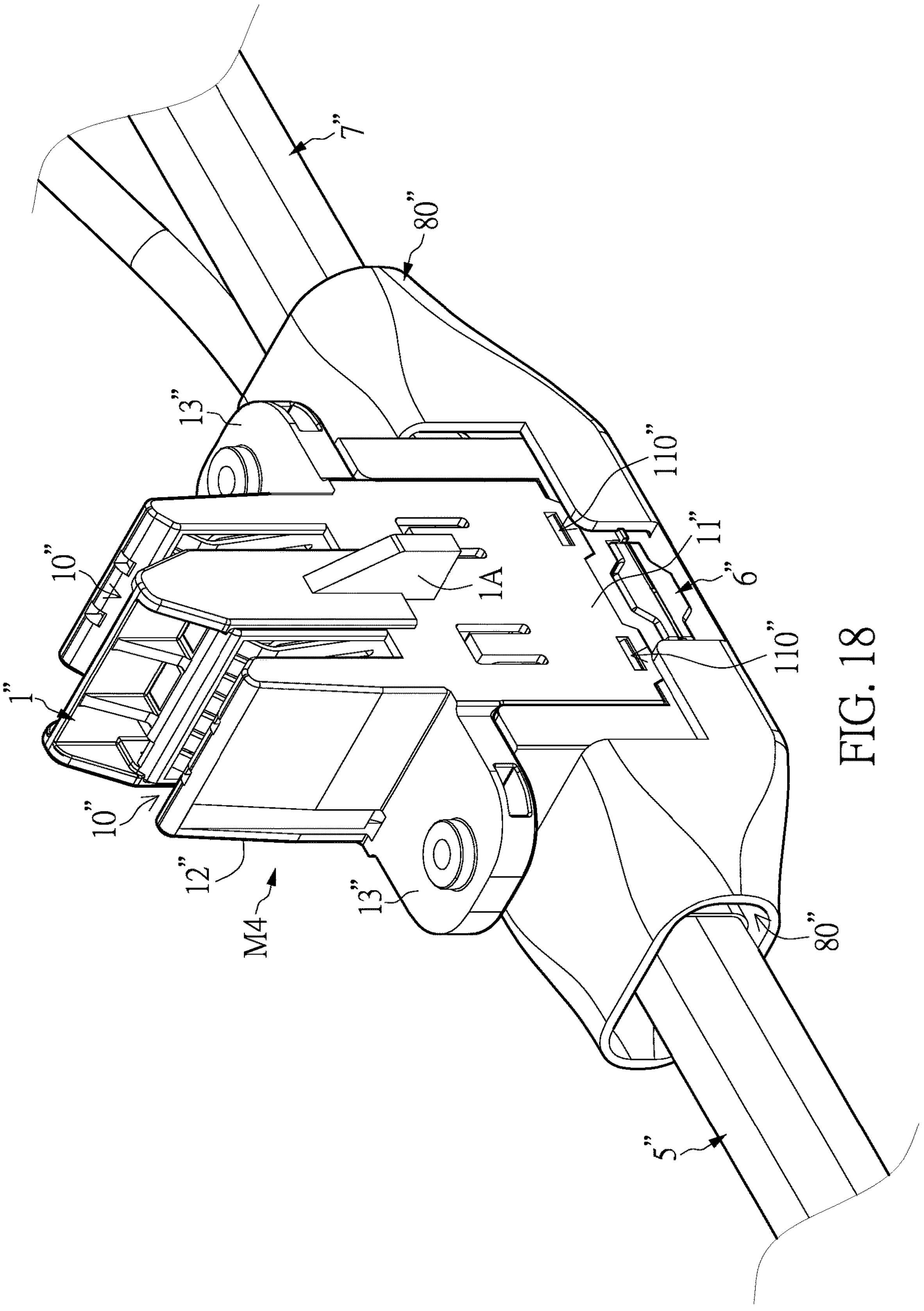
FIG. 18 is a schematic perspective view of the bus bar connector having the replaceable fuse according to a fourth embodiment of the present disclosure.
Figure 19:
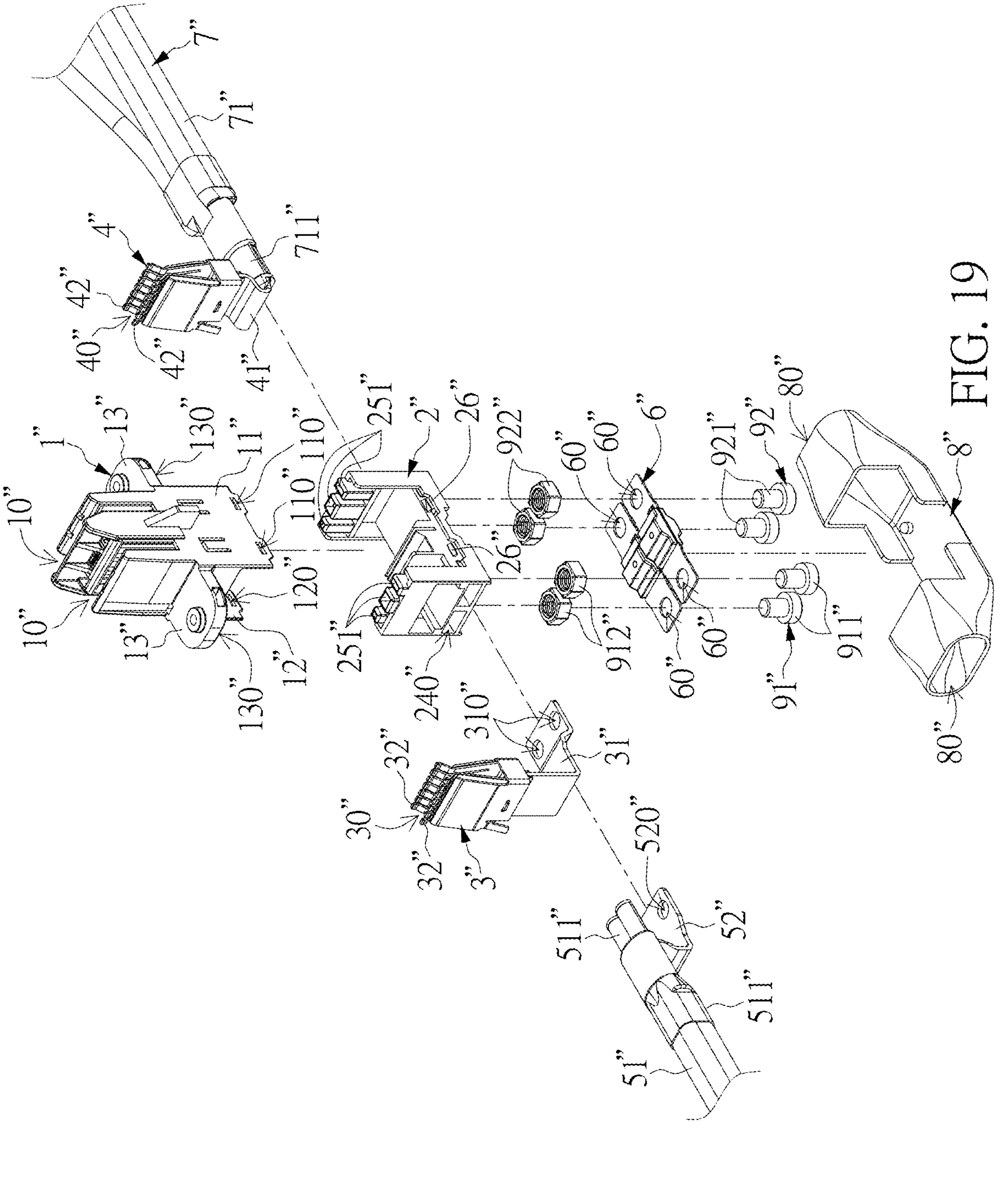
FIG. 19 is a schematic exploded view of the bus bar connector having the replaceable fuse according to the fourth embodiment of the present disclosure.

Referring to FIG. 18 and FIG. 19, a fourth embodiment of the present disclosure provides a bus bar connector M4 having a replaceable fuse, which includes a casing 1", a fixed frame 2", a first terminal assembly 3", a second terminal assembly 4", a first cable assembly 5", two fuse elements 6" and a second cable assembly 7".

The casing 1" includes a first casing wall 11", a second casing wall 12" and two wings 13" respectively disposed between the first casing wall 11" and the second casing wall 12". The first casing wall 11" has a plurality of first slot holes 110". The second casing wall 12" has a plurality of second slot holes 120". Each wing portion 13" has a plurality of positioning holes 130" formed on the bottom thereof. In addition, the casing 1" also forms two socket openings 10" on the front side of the bus bar connector M4, and the fixed frame 2" is disposed on another side (e.g., the rear side of the bus bar connector M4) of the casing 1". The first terminal assembly 3" and the second terminal assembly 4" are disposed inside the casing 1". The two fuse elements 6" are disposed on the fixed frame 2". One end of the first cable assembly 5" is disposed in the fixed frame 2" and electrically connected to the first terminal assembly 3" through the two fuse elements 6". One end of the second cable assembly 7" is disposed in the fixed frame 2" and is electrically connected to the second terminal assembly 4".

Figure 20:
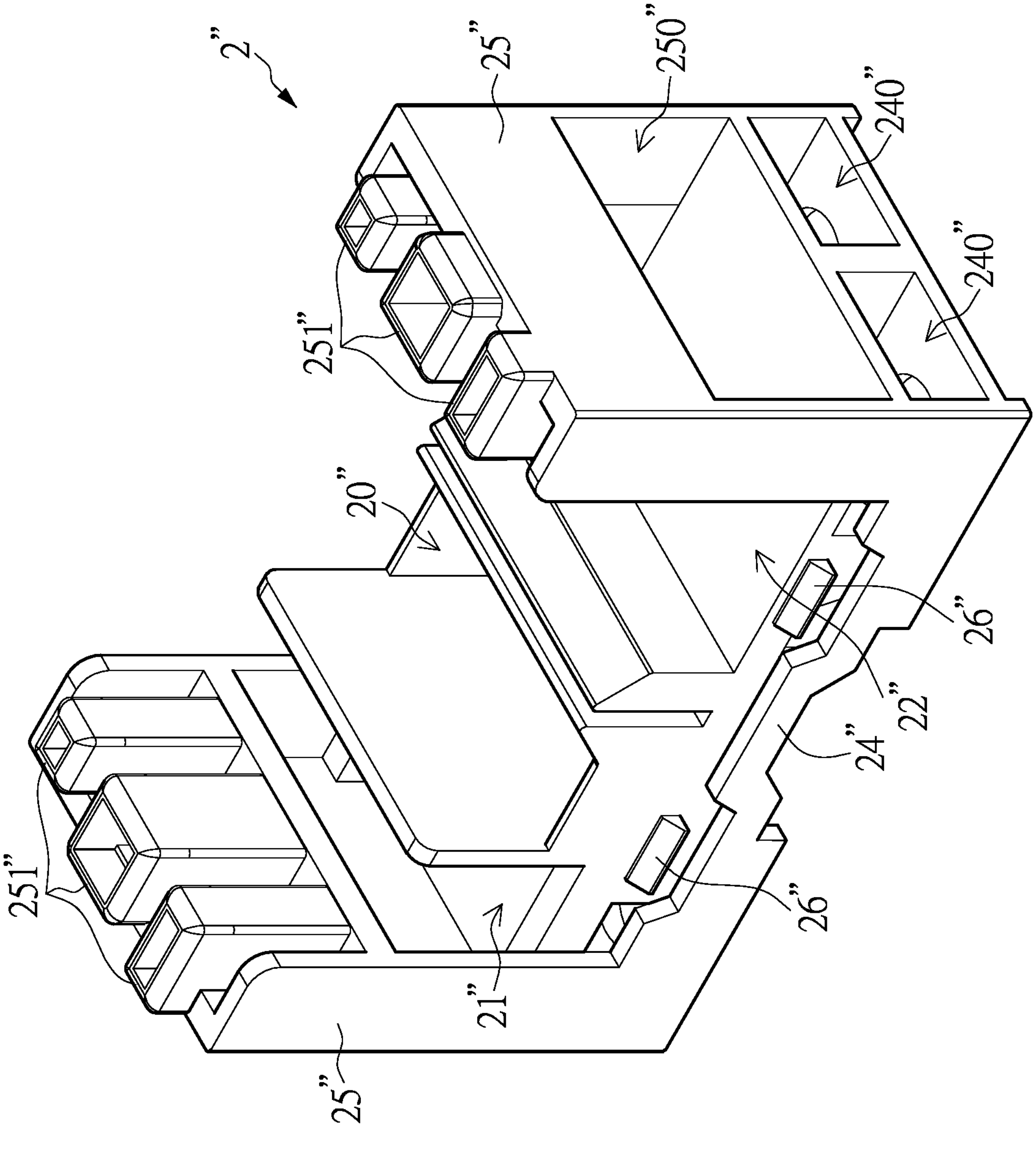
FIG. 20 is a schematic perspective view of the fixed frame of the bus bar connector having the replaceable fuse according to the fourth embodiment of the present disclosure.
Figure 21:
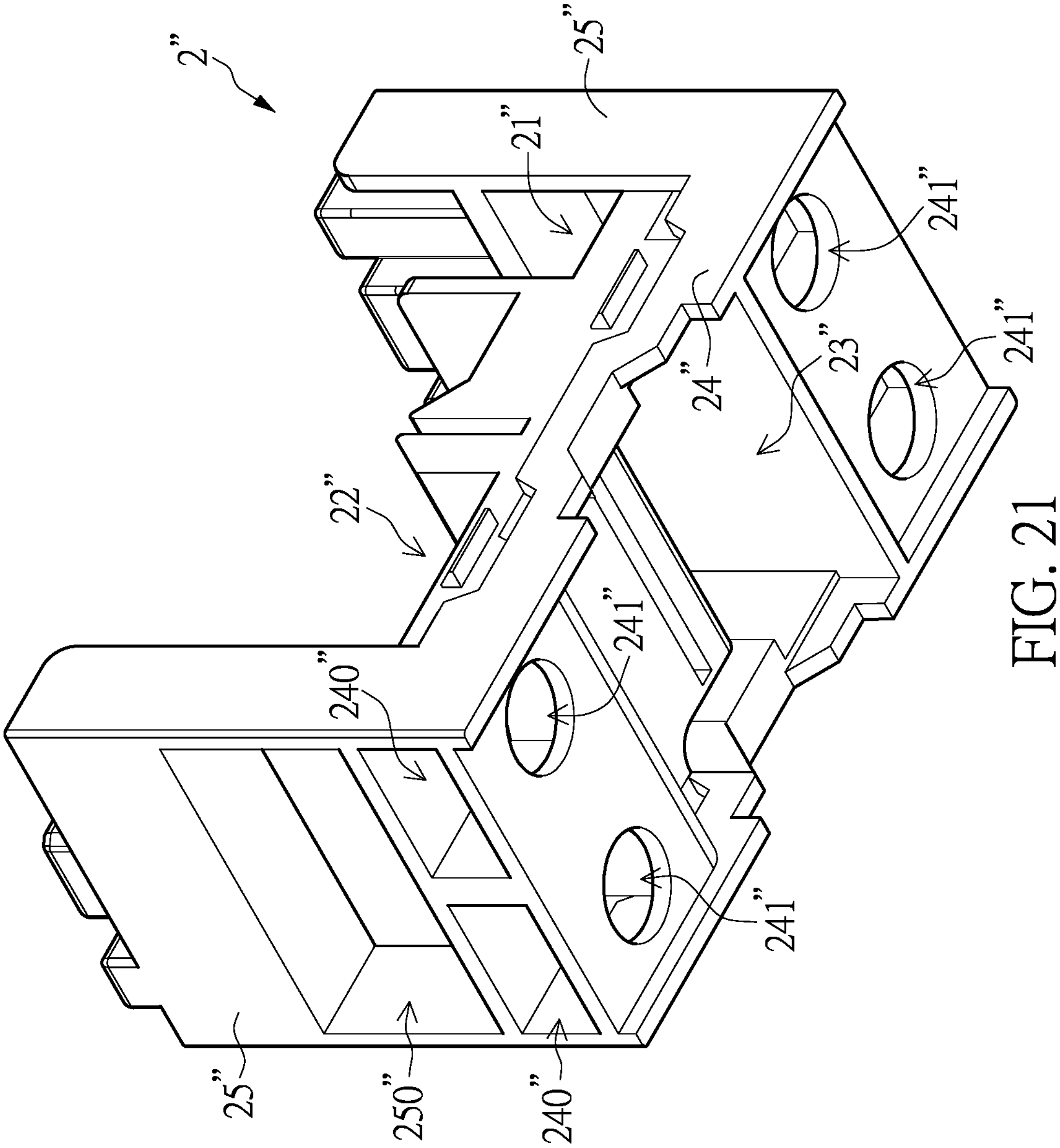
FIG. 21 is another schematic perspective view of the fixed frame of the bus bar connector having the replaceable fuse according to the fourth embodiment of the present disclosure.

Referring to FIG. 20 and FIG. 21, the fixed frame 2" is disposed on the opposite side opposite to the side where the two socket openings 10" of the casing 1" are formed. The fixed frame 2" includes a first accommodating portion 21", a second accommodating portion 22", a third accommodating portion 23", and a first through opening 20" formed between the first accommodating portion 21" and the second accommodating portion 22". The first accommodating portion 21" and the second accommodating portion 22" are located on the same side of the third accommodating portion 23". Furthermore, the fixed frame 2" is a U-shaped structure, and the fixed frame 2" further includes a platform 24" and two side walls 25" respectively disposed on both sides of the platform 24". The two side walls 25" respectively form two second through openings 250". The platform 24" is provided with two accommodating grooves 240" adjacent to each second through opening 250", and the bottom of the platform 24" is provided with a guiding hole 241" adjacent to each accommodating groove 240". Each accommodating groove 240" is communicated with the corresponding guiding hole 241".

Based on the above description, the fixed frame 2" also has a plurality of retaining portions 26". The retaining portions 26" are evenly disposed on both sides of the fixed frame 2". In addition, the two side walls 25" of the fixed frame 2" respectively include a plurality of positioning posts 251". When the fixed frame 2" is disposed on one side of the casing 1", the retaining portions 26" are respectively and detachably clamped or retained in the first slot holes 110" and the second slot holes 120", and the positioning posts 251" are respectively inserted into the positioning holes 130" so as to fix the fixed frame 2" on the casing 1".

Figure 22:
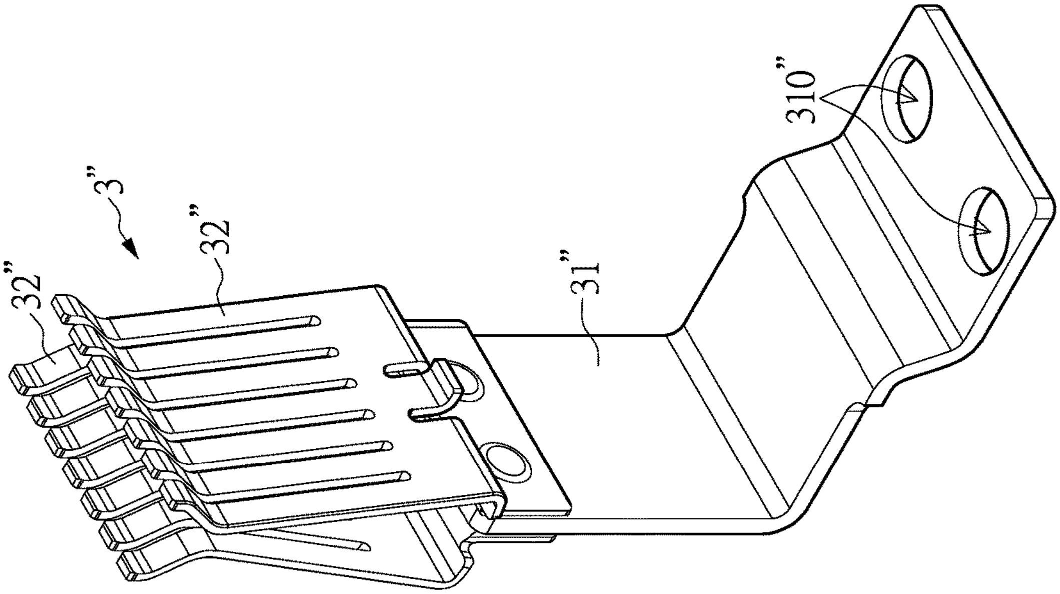
FIG. 22 is a schematic perspective view of the first terminal assembly of the bus bar connector having the replaceable fuse according to the fourth embodiment of the present disclosure.

Referring to FIG. 19 and FIG. 22, the first terminal assembly 3" includes a first connecting element 31" and plural first resilient contacts 32". The second terminal assembly 4" includes a second connecting element 41" and plural second resilient contacts 42". The first resilient contacts 32" are respectively disposed at two opposite sides to form a first interface 30". The second resilient contacts 42" are respectively disposed at two opposite sides to form a second interface 40". The first resilient contacts 32" and the second resilient contacts 42" can be disposed in the casing 1", so that the first interface 30" is communicated with one of the socket openings 10", and the second interface 40" is communicated with the other socket opening 10".

Figure 23:
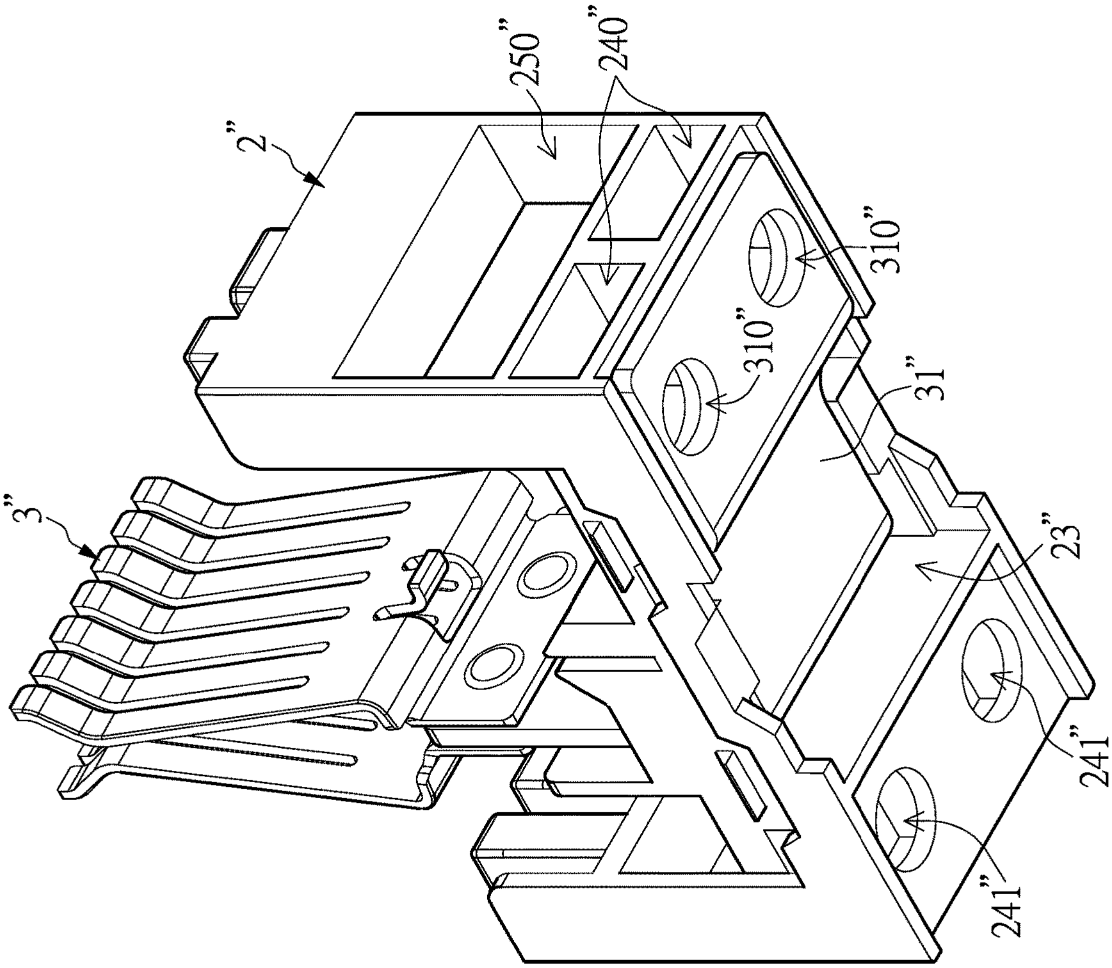
FIG. 23 is a schematic assembled view of the first terminal assembly and the fixed frame of the bus bar connector having the replaceable fuse according to the fourth embodiment of the present disclosure.

Referring to FIG. 21 to FIG. 23, the first connecting element 31" is disposed in the first accommodating portion 21". One end of the first connecting element 31" is connected with the first resilient contacts 32", and another end of the first connecting element 31" is inserted into the first through opening 20" and extends into the third accommodating portion 23", and the two through holes 310" of the first connecting element 31" respectively and corresponding communicated with to the two guiding holes 241".

Continuing to refer to FIG. 18 and FIG. 19, the first cable assembly 5" includes a first cable body 51" and a cable connection portion 52" connected to the first cable body 51". The first cable body 51" has a first fixed portion 511", and the first fixed portion 511" passes through one of the second through openings 250" and is located in the first accommodating portion 21". One end of the cable connection portion 52" is connected to the first fixed portion 511" and another end of the cable connection portion 52" is bent and extended to the third accommodating portion 23", so that the two through holes 520" of the cable connection portion 52" respectively correspond to another two of the guiding holes 241".

Continuing to refer to FIG. 19 to FIG. 21, two fuse elements 6" are disposed side by side in the third accommodating portion 23", and the two fuse elements 6" are connected between the cable connection portion 52" and the connecting elements 31". Furthermore, the bus bar connector M4 further includes two first screwing elements 91" and two second screwing elements 92". Each first screwing element 91" includes a screw 911" and a nut 912", and each second screwing element 92" includes a screw 921" and a nut 922". The two nuts 912" and the two nuts 922" are respectively disposed in the four accommodating grooves 240". The two screws 911" respectively pass through the two through holes 520" of the cable connection portion 52", two of the fixing holes 60" of the two fuse elements 6", and the two guiding holes 241" so as to combine with the two nuts 912" (that is to say, each screw 911" passes through one through hole 520" and one fixing hole 60"), and clamp a part of the fixed frame 2" around the two guiding holes 241". The two screws 921" pass through another two fixing holes 60" of the two fuse elements 6", the two through holes 310" of the first connecting element 31" (that is to say, each screw 921" passes through one through hole 310" and one fixing hole 60") and another two guiding holes 241" so as to combine with the nut 922" of the second screwing element 92" and clamp a part of the fixed frame 2" around another two guiding holes 241".

Continuing to refer to FIG. 19, the second cable assembly 7" includes a second cable body 71", and the second cable body 71" has a second fixed portion 711". The second fixed portion 711" passes through another second through opening 250" and is fixed in the second accommodating portion 22", and the second fixed portion 711" is connected to the second connecting element 41".

Continuing to refer to FIG. 18 and FIG. 19, the bus bar connector M4 further includes a protective cover 8". The protective cover 8" is provided on the opposite side opposite to the side where the fixed frame 2" is disposed on the casing 1". The protective cover 8" is configured to cover the two fuse elements 6". The two sides of the protective cover 8" (i.e., the left and right sides of the bus bar connector M4) respectively form two lateral outlets 80". When the protective cover 8" is configured to cover the two fuse elements 6", the first cable body 51" and the second cable body 71" respectively pass through the two lateral outlets 80" and extend outwardly from the two sides of the fixed frame 2".

Beneficial Effects of the Embodiments

The beneficial effect of the present disclosure is that the bus bar connector with the replaceable fuse provided by the present disclosure can utilize the bus bar connector having a fixed frame, and the fixed frame having at least one accommodating portion, so that a first connecting element of the first terminal assembly, a second connecting element of the second terminal assembly and two fuse elements can be disposed in at least one accommodating portion. Compared with the fuse elements in the related art, which are all welded on the motherboard of the server device, the bus bar connector with the replaceable fuse provided by the present disclosure can be configured to place the fuse elements in at least one accommodating portion of the connector, which is convenient for users to replace, simplifies the replacement steps, and improves the work efficiency of replacing the fuse components.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bus bar connector having a replaceable fuse, comprising:

- a casing having two socket openings formed on a front side thereof;
- a first terminal assembly disposed inside the casing, wherein the first terminal assembly includes a first connecting element and plural first resilient contacts, the plural first resilient contacts are disposed to form a first interface, the first interface is communicated with one of the two socket openings, and a first end portion of the first connecting element is electrically connected with the plural first resilient contacts;
- a second terminal assembly disposed inside the casing, wherein the second terminal assembly includes a second connecting element and plural second resilient contacts, the plural second resilient contacts are disposed to form a second interface, the second interface is communicated with another one of the two socket openings, one end of the second connecting element is electrically connected with the plural second resilient contacts, and another end of the second connecting element extends to form a cable connecting portion;
- at least one first cable assembly including a first cable body and a cable connection portion, wherein the cable connection portion is connected to a side of the first cable body, and the first cable body extends from at least one of a left side and a right side of the casing;
- at least one fuse element connected between the cable connection portion and the first connecting element in series; and
- at least one second cable assembly electrically connected to the cable connecting portion.

2. The bus bar connector having the replaceable fuse according to claim 1, further comprising a fixed frame disposed on an opposite side opposite to a side where the two socket openings of the casing are formed, wherein the at least one fuse element is disposed in the fixed frame.

3. The bus bar connector having the replaceable fuse according to claim 2, further comprising a first cover, wherein a side of the first cover is pivotally connected to the fixed frame.

4. The bus bar connector having the replaceable fuse according to claim 3, wherein the first cover and the fixed frame collectively form two first lateral outlets, the at least one first cable body passes through at least one of the two first lateral outlets, and the first cover is configured to cover the at least one fuse element and the at least one cable connection portion.

5. The bus bar connector having the replaceable fuse according to claim 4, wherein the casing further includes a first casing wall and the first casing wall has two first slot holes, and another side of the first cover has two first retaining portions; wherein, when the first cover is pivoted relative to the fixed frame, the two first retaining portions are respectively and detachably clamped in the two first slot holes.

6. The bus bar connector having the replaceable fuse according to claim 5, further comprising a second cover, wherein the second cover is disposed on the fixed frame to form two second lateral outlets, the at least one second cable assembly passes through at least one of the two second lateral outlets, the second cover is configured to cover the cable connecting portion.

7. The bus bar connector having the replaceable fuse according to claim 5, wherein the first cover has at least one opening to expose at least one portion of the least one fuse element.

8. The bus bar connector having the replaceable fuse according to claim 2, wherein another end of the second connecting element for forming the cable connecting portion further forms at least one positioning portion, the fixed frame has at least one guiding groove, and the least one positioning portion is disposed in the least one guiding groove.

9. The bus bar connector having the replaceable fuse according to claim 8, wherein the casing further has two wings, each wing has a positioning hole formed on a bottom thereof, the fixed frame further includes two abutting portions, and each abutting portion has a positioning post formed on a top thereof; wherein, when the fixed frame is disposed on one side of the casing, the two positioning posts are respectively inserted into the two positioning holes.

10. The bus bar connector having the replaceable fuse according to claim 1, further comprising a protective cover disposed on another side of the casing, wherein the protective cover is configured to cover the at least one fuse element.

11. The bus bar connector having the replaceable fuse according to claim 10, wherein the protective cover has at least one opening to expose at least one portion of the least one fuse element.

12. A bus bar connector having a replaceable fuse, comprising:

a casing including two socket openings;

a fixed frame disposed on a side of the casing, wherein the fixed frame has an accommodating portion and a first lateral outlet formed on a side;

a first terminal assembly disposed inside the casing, wherein the first terminal assembly includes a first connecting element and plural first resilient contacts, the plural first resilient contacts are disposed to form a first interface, the first interface is communicated with one of the two socket openings, an end of the first connecting element is connected with the plural first resilient contacts, and another end of the first connecting element extends inserted into the fixed frame;

a second terminal assembly disposed inside the casing, wherein the second terminal assembly includes a second connecting element and plural second resilient contacts, the second connecting element is connected with the second resilient contacts, the plural second resilient contacts are disposed to form a second interface, and the second interface is communicated with another one of the two socket openings;

a first cable assembly including a first cable body and a cable connection portion connected to one side of the first cable body, the first cable body has a first fixed portion, and the first fixed portion is disposed at the first lateral outlet;

at least one fuse element disposed in the accommodating portion, wherein the least one fuse element is connected between the cable connection portion and the first connecting element; and a second cable assembly including a second cable body, wherein the second cable body has a second fixed portion, and the second fixed portion is connected to the second connecting element.

13. The bus bar connector having the replaceable fuse according to claim 12, further comprising a protective cover disposed on an opposite side opposite to a side where the two socket openings of the casing are formed, wherein the protective cover and the casing form a second lateral outlet, the protective cover is configured to cover the least one fuse element, the protective cover has a plurality of retaining portions, the casing further includes a first casing wall and a second casing wall, and each of the first casing wall and the second casing wall has a plurality of slot holes; wherein, when the protective cover is disposed on the casing, the retaining portions are respectively and detachably retained in the slot holes.

14. The bus bar connector having the replaceable fuse according to claim 13, further comprising a screwing element, wherein the screwing element is connected between the least one fuse element and the cable connection portion, and clamps a part of the fixed frame.

15. The bus bar connector having the replaceable fuse according to claim 14, wherein the fixed frame further includes a plurality of positioning posts, the casing includes two wings, and one of the two wings that is closer to the fixed frame has a plurality of positioning holes; wherein, when the fixed frame is disposed on one side of the casing, the positioning posts are respectively inserted into the positioning holes.

16. A bus bar connector having a replaceable fuse, comprising:

a casing including two socket openings;

a fixed frame disposed on an opposite side opposite to a side where the two socket openings of the casing are formed, wherein the fixed frame includes a first accommodating portion, a second accommodating portion, and a third accommodating portion, and the first accommodating portion and the second accommodating portion are located on a same side of the third accommodating portion;

a first terminal assembly disposed inside the casing, wherein the first terminal assembly includes a first connecting element and plural first resilient contacts, the plural first resilient contacts are disposed to form a first interface, the first interface is communicated with one of the two socket openings, the first connecting element is disposed in the first accommodating portion, and an end of the first connecting element is connected with the first resilient contacts, and another end of the first connecting element extends into the third accommodating portion;

a second terminal assembly disposed inside the casing, wherein the second terminal assembly includes a second connecting element and plural second resilient contacts, the second connecting element is connected with the plural second resilient contacts, the plural second resilient contacts are disposed to form a second interface, and the second interface is communicated with another one of the two socket openings;

a first cable assembly including a first cable body and a cable connection portion connected to the first cable body, wherein the first cable body has a first fixed portion, the first fixed portion is fixed in the first accommodating portion, an end of the cable connection portion is connected to the first fixed portion and another end of the cable connection portion is bent and extended to the third accommodating portion;

at least one fuse element disposed in the third accommodating portion, wherein the least one fuse element is connected between the cable connection portion and the first connecting element; and a second cable assembly including a second cable body, wherein the second cable body has a second fixed portion, the second fixed portion is fixed in the second accommodating portion, and the second fixed portion is connected to the second connecting element.

17. The bus bar connector having the replaceable fuse according to claim 16, wherein the fixed frame is a U-shaped structure, and the fixed frame further includes a platform and two side walls respectively disposed on the platform, the two side walls respectively have two second through openings, the platform is provided with two accommodating grooves respectively adjacent to the two second through openings, a bottom of the platform is provided with two guiding holes respectively adjacent to the two accommodating groove, and each of the two accommodating grooves is communicated with a corresponding one of the two guiding holes.

18. The bus bar connector having the replaceable fuse according to claim 17, further comprising a protective cover disposed on an opposite side opposite to a side where the fixed frame is disposed on the casing, wherein the protective cover is configured to cover the two fuse elements, and two lateral outlets are respectively formed on both sides of the protection cover; wherein, the first cable body and the second cable body respectively pass through the two lateral outlets.

19. The bus bar connector having the replaceable fuse according to claim 17, wherein the fixed frame further has a plurality of retaining portions, the casing further includes a first casing wall and a second casing wall, and each of the first casing wall and the second casing wall has a plurality of slot holes; wherein, when the protective cover is disposed on the casing, the retaining portions are respectively and detachably retained in the slot holes.

20. The bus bar connector having the replaceable fuse according to claim 16, further comprising one screwing elements, wherein the screwing element is connected between the least one fuse element and the cable connection portion, and clamps a part of the fixed frame.

* * * * *